(12) United States Patent
Beard et al.

(10) Patent No.: US 11,445,020 B2
(45) Date of Patent: Sep. 13, 2022

(54) CIRCUITRY AND METHOD

(71) Applicant: Arm Limited, Cambridge (GB)

(72) Inventors: Jonathan Curtis Beard, Austin, TX (US); Jamshed Jalal, Austin, TX (US); Curtis Glenn Dunham, Austin, TX (US); Roxana Rusitoru, Cambridge (GB)

(73) Assignee: Arm Limited, Cambridge (GB)

( * ) Notice: Subject to any disclaimer, the term of this patent is extended or adjusted under 35 U.S.C. 154(b) by 157 days.

(21) Appl. No.: 16/828,207

(22) Filed: Mar. 24, 2020

(65) Prior Publication Data

US 2021/0306414 A1 Sep. 30, 2021

(51) Int. Cl.
*G06F 11/07* (2006.01)
*H04L 67/1095* (2022.01)
(Continued)

(52) U.S. Cl.
CPC ...... *H04L 67/1095* (2013.01); *G06F 11/0784* (2013.01); *G06F 11/1451* (2013.01);
(Continued)

(58) Field of Classification Search
CPC ............ H04L 67/1095; G06F 11/073; G06F 11/3034; G06F 11/3037; G06F 11/1064;
(Continued)

(56) References Cited

U.S. PATENT DOCUMENTS

| 6,263,405 B1 * | 7/2001 | Irie | G06F 12/0813 |
| | | | 711/140 |
| 6,553,409 B1 * | 4/2003 | Zhang | G06F 12/0815 |
| | | | 709/213 |

(Continued)

OTHER PUBLICATIONS

International Search Report and Written Opinion of the International Searching Authority for PCT/GB2021/050540 dated Jun. 16, 2021, 14 pages.
(Continued)

*Primary Examiner* — Yolanda L Wilson
(74) *Attorney, Agent, or Firm* — Nixon & Vanderhye P.C.

(57) ABSTRACT

Circuitry comprises a set of data handling nodes comprising: two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory; a home node to serialise data access operations and to control coherency amongst data items held by the set of data handling nodes so that data written to a memory address is consistent with data read from that memory address in response to a subsequent access request; and one or more slave nodes including the main memory; in which: a requesting node of the set of data handling nodes is configured to communicate a conditional request to a target node of the set of data handling nodes in respect of a copy of a given data item at a given memory address, the conditional request being associated with an execution condition and being a request that the copy of the given data item is written to a destination node of the data handling nodes; and the target node is configured, in response to the conditional request: (i) when the outcome of the execution condition is successful, to write the data item to the destination node and to communicate a completion-success indicator to the requesting node; and (ii) when the outcome of the execution condition is a failure, to communicate a completion-failure indicator to the requesting node.

19 Claims, 15 Drawing Sheets

(51) Int. Cl.
*G06F 11/14* (2006.01)
*G06F 11/30* (2006.01)
*G06F 15/78* (2006.01)
*G06F 12/0808* (2016.01)
*G06F 12/0815* (2016.01)

(52) U.S. Cl.
CPC ...... *G06F 11/3034* (2013.01); *G06F 12/0808* (2013.01); *G06F 12/0815* (2013.01); *G06F 15/7825* (2013.01)

(58) Field of Classification Search
CPC ............. G06F 12/0808; G06F 12/0815; G06F 15/7825
See application file for complete search history.

(56) References Cited

U.S. PATENT DOCUMENTS

| | | | |
|---|---|---|---|
| 8,438,337 B1 | 5/2013 | Garg et al. | |
| 2002/0124144 A1* | 9/2002 | Gharachorloo | G06F 12/0828 711/145 |
| 2008/0229020 A1 | 9/2008 | Plamondon | |
| 2014/0052921 A1* | 2/2014 | Biles | G06F 9/3834 711/125 |
| 2014/0237194 A1* | 8/2014 | Dusanapudi | G06F 12/0815 711/141 |
| 2015/0055557 A1* | 2/2015 | Dong | H04L 67/2842 370/328 |
| 2015/0161054 A1* | 6/2015 | Ghai | G06F 12/0811 711/135 |
| 2015/0331794 A1* | 11/2015 | Ren | G06F 12/0833 709/214 |
| 2016/0124653 A1 | 5/2016 | Ambroladze et al. | |
| 2017/0026483 A1* | 1/2017 | Ruellan | H04L 67/2842 |
| 2018/0150321 A1 | 5/2018 | Dunham et al. | |
| 2020/0034312 A1 | 1/2020 | Williams et al. | |

OTHER PUBLICATIONS

Maged M. Michael et al., "Simple, Fast, and Practical Non-Blocking and Blocking Concurrent Queue Algorithms", Department of Computer Science, University of Rochester, PODC '96: Proceedings of the fifteenth annual ACM symposium on Principles of distributed computing, May 1996, pp. 267-275.

Edya Ladan-Mozes et al., An Optimistic Approach to Lock-Free FIFO Queues. In: Guerraoui R. (eds) Distributed Computing. DISC 2004. Lecture Notes in Computer Science, vol. 3274, 15 pages.

* cited by examiner

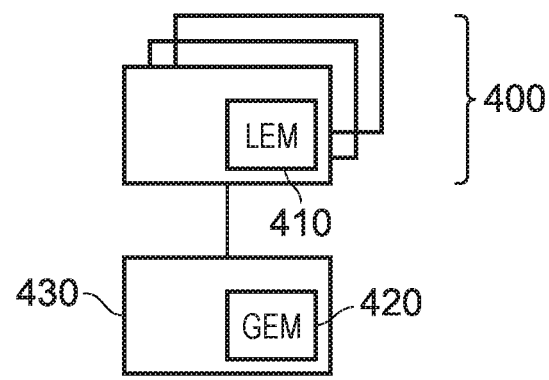
FIG. 4b
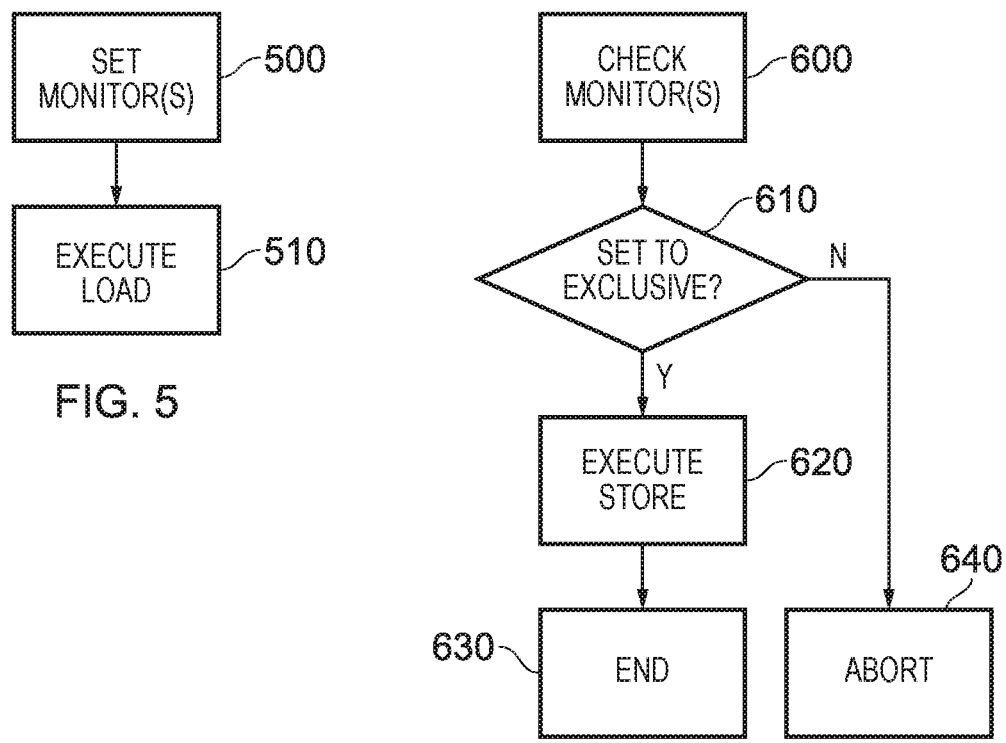
FIG. 5
FIG. 6

CIRCUITRY AND METHOD

BACKGROUND

This disclosure relates to circuitry and methods.

Data transfer protocols can regulate the operation of data transfers between devices or nodes connected to one another via interconnect circuitry, for example in the context of a system on chip (SoC) or network on chip (NoC) system. An example of such a data transfer protocol is the so-called AMBA (Advanced Microcontroller Bus Architecture) CHI (Coherent Hub Interface) protocol.

In the CHI protocol, nodes can be categorised as request nodes (RN), home nodes (HN) or slave nodes (SN). Nodes can be fully coherent or input/output (I/O) coherent. A fully coherent HN or RN (HN-F, RN-F respectively) may include coherent cache storage or is at least capable of responding to the coherence protocol; a fully coherent SN (SN-F) is paired with an HN-F. An HN-F can manage coherency and/or serialisation for a memory region, and may be referred to as an example of a point of coherency (POC) and/or point of serialisation (POS).

Here, the term "coherent" implies that that data written to a memory address in the coherent memory system by one node is consistent with data subsequently read from that memory address in the coherent memory system by another of the nodes. A role of logic associated with the coherence function is therefore to ensure that before a data handling transaction takes place, an up to date copy is provided. If another node alters its copy, the coherence system will invalidate other copies which then have to be re-obtained if needed. Similarly, if the data handling transaction involves modifying a data item, then coherence logic avoids conflicts with other existing copies of the data item.

Serialisation relates to the ordering of the handling of memory access requests from potentially multiple requesting nodes, and potentially taking different latency periods to be serviced, so that the results from those requests are presented in the correct order to the requesting nodes, and any dependencies between the requests (for example, a data read subsequent to a data write to the same address) are correctly handled.

Data accesses may be made via the HN-F, which may in turn refer the data access request to an SN-F for resolution.

The present disclosure aims to provide potential improvements with relation to such arrangements.

SUMMARY

The present disclosure provides circuitry having:
a set of data handling nodes comprising:
two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory;
a home node to serialise data access operations and to control coherency amongst data items held by the set of data handling nodes so that data written to a memory address is consistent with data read from that memory address in response to a subsequent access request; and
one or more slave nodes including the main memory;
in which:

a requesting node of the set of data handling nodes is configured to communicate a conditional request to a target node of the set of data handling nodes in respect of a copy of a given data item at a given memory address, the conditional request being associated with an execution condition and being a request that the copy of the given data item is written to a destination node of the data handling nodes; and the target node is configured, in response to the conditional request:

(i) when the outcome of the execution condition is successful, to write the data item to the destination node and to communicate a completion-success indicator to the requesting node; and (ii) when the outcome of the execution condition is a failure, to communicate a completion-failure indicator to the requesting node.

The present disclosure also provides a method comprising:

communicating data between a set of data handling nodes comprising:
two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory;
a home node to serialise data access operations and to control coherency amongst data items held by the set of data handling nodes so that data written to a memory address is consistent with data read from that memory address in response to a subsequent access request; and
one or more slave nodes including the main memory;

a requesting node of the set of data handling nodes communicating a conditional request to a target node of the set of data handling nodes in respect of a copy of a given data item at a given memory address, the conditional request being associated with an execution condition and being a request that the copy of the given data item is written to a destination node of the data handling nodes; and the target node, in response to the conditional request:

(i) writing, when the outcome of the execution condition is successful, the data item to the destination node and to communicate a completion-success indicator to the requesting node; and (ii) communicating, when the outcome of the execution condition is a failure, a completion-failure indicator to the requesting node.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 4b schematically illustrates the use of exclusive monitors;
FIGS. 5 and 6 are schematic flowcharts illustrating respective methods.

DESCRIPTION OF EMBODIMENTS

Figure 1:
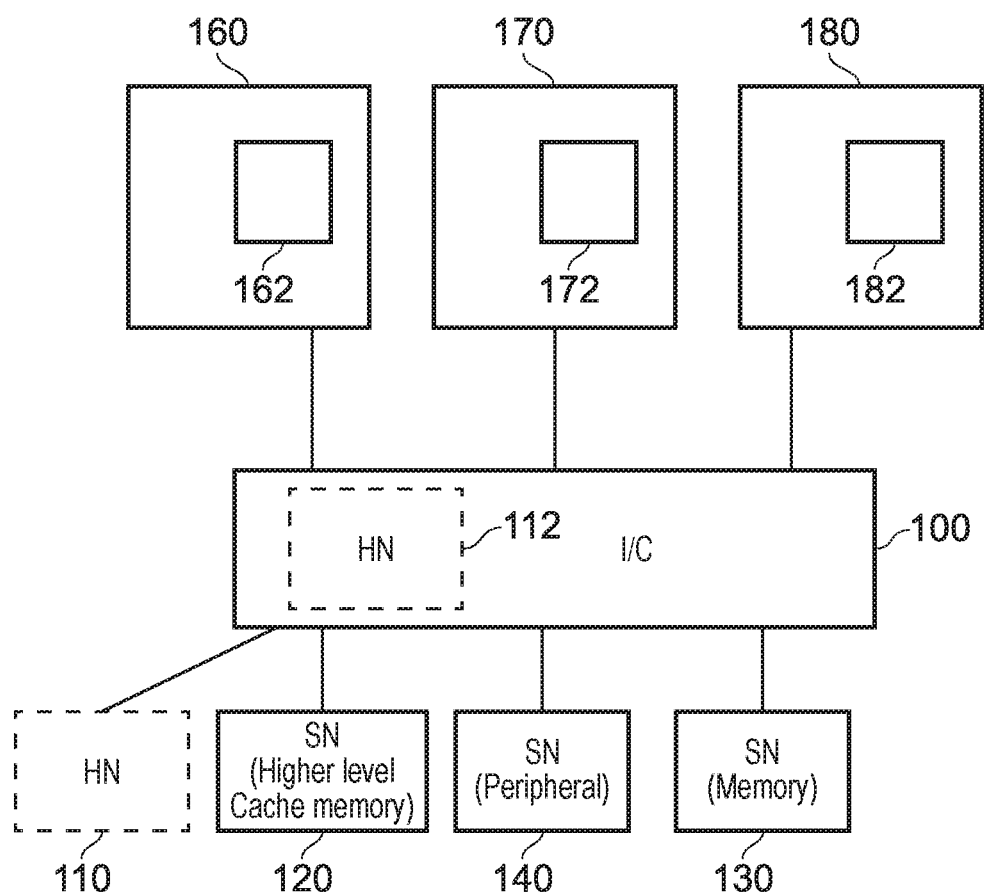
FIG. 1 schematically illustrates an example circuitry.

Before discussing the embodiments with reference to the accompanying figures, the following description of embodiments is provided.

An example embodiment provides circuitry having:
a set of data handling nodes comprising:
two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory;
a home node to serialise data access operations and to control coherency amongst data items held by the set of data handling nodes so that data written to a memory address is consistent with data read from that memory address in response to a subsequent access request; and
one or more slave nodes including the main memory;
in which:
a requesting node of the set of data handling nodes is configured to communicate a conditional request to a target node of the set of data handling nodes in respect of a copy of a given data item at a given memory address, the conditional request being associated with an execution condition and being a request that the copy of the given data item is written to a destination node of the data handling nodes; and
the target node is configured, in response to the conditional request:
(i) when the outcome of the execution condition is successful, to write the data item to the destination node and to communicate a completion-success indicator to the requesting node; and
(ii) when the outcome of the execution condition is a failure, to communicate a completion-failure indicator to the requesting node.

Example embodiments provide an arrangement by which a bus or other write relating to a data item in a coherent system is implemented in a way which is conditional upon an execution condition. The condition may be, for example, a condition indicating whether the target node of the request (or the destination node of a data item covered by the request, if different) is able to handle the data item in the manner requested, or may be another condition which is outside the control of at least the requesting node.

The example embodiments are particularly suited to situations in which a data write is being performed by the requesting node for a data item at a first address, with the ultimate destination being requested to store the data item at a second, different, address. The arrangement can provide potentially improved security that the data item will not be lost in the case that the target or destination node is unable to fulfil the request.

The indicator information may indicate various aspects of a status such as one or more of unique/shared, clean/dirty but in example embodiments the indicator information is configured to indicate at least whether the respective copy is a unique copy amongst the set of data handling nodes. therefore in some examples, the indicator information is configured to indicate whether the respective copy is a unique copy amongst the set of data handling nodes.

In example embodiments the requesting node is configured to communicate the conditional request in respect of the copy of the given data item when the indicator information associated with that copy indicates that the respective copy is a unique copy (UC/UD) amongst the set of data handling nodes. In the case that the copy is already in a unique clean state, the overall effect may be to perform a null operation with respect to that copy, in which case when the indicator information associated with the copy of the given data item indicates that the main memory holds the most up to date version of the given data item, the target node is configured not to control any change to the indicator information.

In example arrangements the target node is the home node.

The execution condition may represent a single condition but in other examples the execution condition may comprise a logical comparison of a plurality of conditions with respective target outcomes. For example, the logical comparison may be a comparison (such as an AND operation) which requires all of the plurality of conditions to have their respective target outcomes.

In example arrangements each data handling node is configured to hold the indicator data associated with a copy of a data item held by that data handling node.

The destination node may be the same as the target node, or in other examples the destination node is the main memory. In other examples, the destination node is a master node or the home node.

In some examples, such as those referred to below under the term "write-clean-conditional", the step (i) may comprise controlling the indicator information associated with the copy of the given data item to indicate that the copy of the given data item has not been updated more recently than the data item held by the main memory (e.g. "clean"); and the step (ii) may comprise controlling the indicator information associated with the copy of the given data item to indicate that the copy of the given data item has been updated more recently than the data item held by the main memory (e.g. "dirty").

In examples of a successful write-clean-conditional or similar operation, the requesting node is configured, in response to receipt of the completion-success indicator, to set the indicator information associated with the copy of the given data item to indicate that the main memory holds the most up to date version of the given data item. However, in the case that at communication of the conditional request to the target node, the indicator information associated with the copy of the given data item indicates that the main memory holds the most up to date version of the given data item, the target node may be configured not to control any change to the indicator information.

In these examples the execution condition may represent whether the target node is currently able to control writing of the data item to the destination node.

In examples such as those referred to below as "write-push-conditional", the step (i) may comprise controlling the indicator information associated with the copy of the given data item to indicate that the copy of the given data item at the requesting node is invalid; and the step (ii) may comprise controlling the indicator information associated with the copy of the given data item to indicate that the copy of the given data item has been updated more recently than the data item held by the main memory.

In such arrangements, the requesting node may be configured, in response to receipt of the completion-failure indicator, to set the indicator information associated with the copy of the given data item to indicate that the copy of the given data item has been updated more recently than the data item held by the main memory.

The execution condition may represent whether the destination node is currently able to receive the data item.

The techniques discussed above are particularly applicable to arrangements in which the requesting node of the set of data handling nodes is configured to initiate a sequence of operations requiring exclusive access to data at a given memory address, the sequence of operations including an exclusive store operation to the given memory address. Such an arrangement can be applicable to (for example) a so-called load-link/store-conditional operation. In examples, the requesting node is configured to implement the exclusive store operation using the conditional request. In various examples the exclusive store operation comprises setting a particular value to data representing an exclusivity monitor.

Another example embodiment provides a method comprising:

communicating data between a set of data handling nodes comprising:
- two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory;
- a home node to serialise data access operations and to control coherency amongst data items held by the set of data handling nodes so that data written to a memory address is consistent with data read from that memory address in response to a subsequent access request; and
- one or more slave nodes including the main memory;
- a requesting node of the set of data handling nodes communicating a conditional request to a target node of the set of data handling nodes in respect of a copy of a given data item at a given memory address, the conditional request being associated with an execution condition and being a request that the copy of the given data item is written to a destination node of the data handling nodes; and
- the target node, in response to the conditional request:
  (i) writing, when the outcome of the execution condition is successful, the data item to the destination node and to communicate a completion-success indicator to the requesting node; and
  (ii) communicating, when the outcome of the execution condition is a failure, a completion-failure indicator to the requesting node.

Overview of Circuitry

Referring now to the drawings, FIG. 1 schematically illustrates circuitry embodied as a network of devices interconnected by an interconnect 100. The apparatus may be provided as a single integrated circuit such as a so-called system on chip (SoC) or network on chip (NoC) or as a plurality of interconnected discrete devices.

Various so-called nodes are connected via the interconnect 100. These include one or more home nodes (HN) 110 which oversee data coherency within the networked system, one or more slave nodes (SN) such as a higher level cache memory 120 (the reference to "higher level" being with respect to a cache memory provided by a requesting node and described below), a main memory 130 and a peripheral device 140. The selection of slave nodes shown in FIG. 1 is by way of example, and zero or more of each type of slave node may be provided.

In other examples, the functionality of the HN may be provided by HN circuitry 112 of the interconnect 100. For this reason, the HN 110 and the HN circuitry 112 are both shown in broken line; in general terms, a single HN is provided for a particular memory region to oversee coherency amongst the various nodes, but it is a matter of design choice whether or not to implement that HN functionality at the interconnect or elsewhere. The memory space may be partitioned between multiple HNs.

FIG. 1 also shows a plurality of so-called requesting or master nodes (RN) 160, 170, 180, which operate according to the CHI (coherent hub interface) protocol, although any coherent protocol may be used. These may be implemented by, for example, processors or processing elements.

The nodes can be fully coherent or input/output (I/O) coherent. A fully coherent HN or RN (HN-F, RN-F respectively) includes coherent cache storage. A fully coherent SN (SN-F) is paired with an HN-F. An HN-F can manage coherency for a memory region. In the present example, the RNs 160-180 are fully coherent RN (RN-F) each having an associated cache memory 162, 172, 182 as an example of storage circuitry at that node to hold data.

In example arrangements, each of the one or more slave nodes may be configured to accept each data transmission directed to that slave node independently of any other data transmissions directed to that slave node.

Therefore, the arrangement of FIG. 1 provides an example of circuitry comprising a set of two or more data handling nodes 160, 170, 180 each having respective storage circuitry 162, 172, 182 to hold data; and a home node 110/112 to serialise data access operations and to control coherency amongst data held by the one or more data handling nodes so that data written to a memory address is consistent with data read from that memory address in response to a subsequent access request.

Data can be handled within the arrangement of FIG. 1 by so-called transactions. In respect of any particular transaction, a node which initiates the transaction (for example by issuing a request message) is referred to as the requesting node or master for that transaction. So, although there are multiple RNs shown in FIG. 1, for any particular transaction one of these will be the RN in respect of that transaction. The HN receives the request message from the relevant RN and handles the execution of that transaction while maintaining coherency amongst the data held by the various nodes.

In the context of a transaction, a "requester" or "requesting node" is a component that starts a transaction by issuing a Request message. The term Requester can be used for a component that independently initiates transactions and such a component is also referred to as a master. The term Requester can also be used for an interconnect component that issues a downstream Request message as a side-effect of other transactions that are occurring in the system.

FIG. 1 therefore provides an example of circuitry having: a set of data handling nodes 160, 170, 180, 110, 120, 140, 130) comprising: two or more master nodes 160, 170, 180 each having respective storage circuitry 162, 172, 182 to hold copies of data items from a main memory 130, each copy of a data item being associated with indicator information to indicate a coherency state of the respective copy, the indicator information being configured to indicate at least whether that copy has been updated more recently than the data item held by the main memory; a home node 110 (112) to serialise data access operations and to control coherency amongst data items held by the set of data handling nodes so that data written to a memory address is consistent with data read from that memory address in response to a subsequent access request; and one or more slave nodes 120, 130, 140 including the main memory.

Home Node

Figure 2:
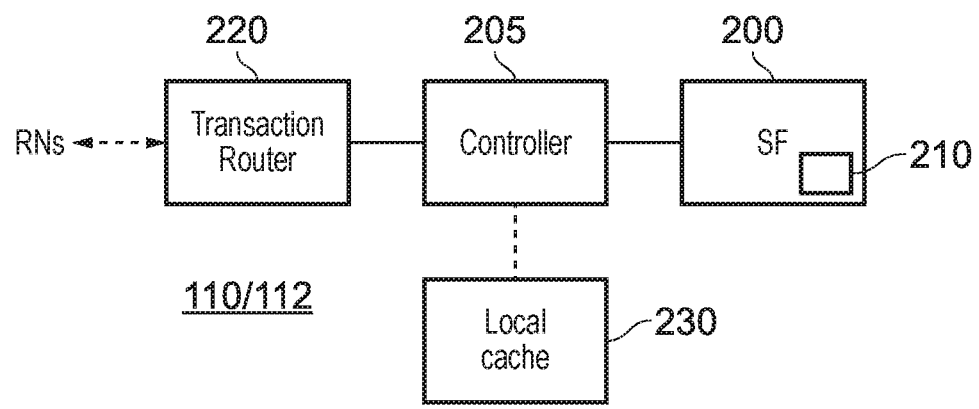
FIG. 2 schematically illustrates a home node.

FIG. 2 schematically illustrates an example of the operation of the home node 110 in terms of its functionality as a cache coherency controller including a snoop filter (the home node or HN otherwise being referred to as a point of coherence or, in the discussion below, as at least a part of a coherence network).

The term "snoop filter" is a historical one and is used here to refer (for example) to a control device which may have an associated "directory", where the directory stores information indicating which data is stored in which cache, and the snoop filter itself at least contributes to the handling of data accesses to cached information so as to provide a cache coherence function.

The cache functionality controller includes the snoop filter in the present embodiments. The snoop filter can provide some or all of the functionality relating to overseeing the handling of data accesses across a cache coherent system.

In FIG. 2 a snoop filter 200, having the directory 210 as discussed above is associated with a controller 205 and a transaction router 220. The transaction router 220 is in data communication with one or more RNs having cache memories. Each RN may have an associated agent (not shown in FIG. 2) responsible for the local handling of data read and write operations with respect to that cache memory. The HN may itself have a cache memory 230 under the oversight (for coherency purposes) of the HN.

The snoop filter 200 handles at least a part of a process under which, when any of the RNs of FIG. 1 intends to access or modify data which is stored as a cache line in any of the cache memories, that node obtains permission to do so. As part of this process, the snoop filter 200 checks whether any other cache memories have a copy of the line which is to be modified. If any other copies are in existence at other cache memories, then those copies need to be cleared and invalidated. If those copies themselves contain modifications to the stored data in that line, then in at least some circumstances, the controller 205 (or the snoop filter 200) instructs the cache memory to write that line back to main memory or at least to the point of coherence.

In the case of a read access by a node with respect to data stored in a cache memory, it is important that the RN requesting the read has access to the latest correct version of the cached data. The controller 205 oversees this process so that if another cache has a recently-modified version of the required data, that other cache writes back the modified version and/or forwards a copy of the modified version for caching at the currently requesting node.

A snoop operation or query may also be initiated by the circuitry of FIG. 2. This may involve sending a message to a cache memory which is indicated, by the directory, to be caching a memory address that is being accessed by another cache memory, and receiving a response from the cache memory which received the message, the response indicating whether that cache memory is actually caching that memory address. Example snoop operations will be discussed further below.

In many practical examples of a data processing system of the type shown in FIG. 1, nearly all of the checks carried out by the snoop filter 200 might be expected to miss, which is to say they would not uncover replication of data between multiple caches. But nevertheless, the checks carried out by the snoop filter 200 are essential to maintaining cache coherence. In order to improve the efficiency of the process and to allow the snoop filter 200 to avoid making checks which are definitely going to miss, the snoop filter 200 maintains the directory 210 indicating to the snoop filter 200 which data is stored at which cache. In some examples this can allow the snoop filter 200 to reduce the number of snoop operations (by avoiding carrying out such operations where a particular line is not held in any cache, or is held only at the cache corresponding to the node which is currently accessing that data). In examples it can also allow data communications relating to snoop operations to be better targeted (for example as unicast or multicast communications) to the appropriate cache(s) rather than to be broadcast as snoop operations to all of the caches.

Therefore, when a potential snoop operation is initiated, the snoop filter 200 may consult the directory 210 to detect whether the information in question is held in one or more of the caches. If a snoop operation is indeed needed to enquire as to the current status of the data at one or more caches, then the snoop filter 200 can carry out that enquiry as a unicast or multicast communication (rather than a broadcast communication) as appropriate.

In some example embodiment the home node 160 (as an example) has the ability to specify that a data buffer (which could be a cache line) is in effect exclusive with respect to the memory system (which is to say that it represents the only copy) and that stores performed from this buffer appear atomically to the rest of the system.

Cache Memory

Figure 3:
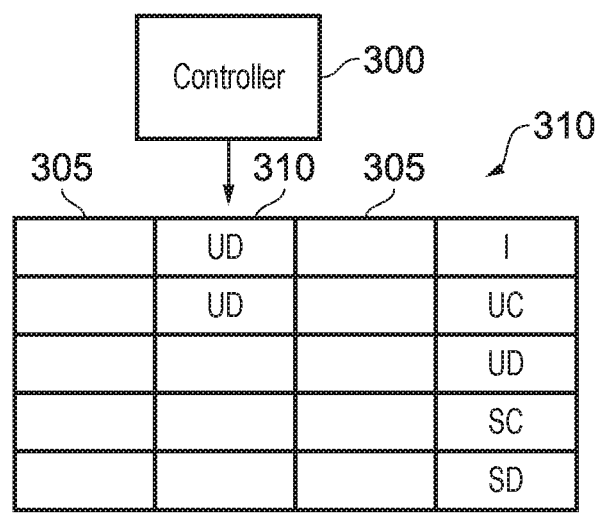
FIG. 3 schematically illustrates a cache memory.

FIG. 3 schematically illustrates aspects of a cache memory, for example being the local cache memory 230 at the HN or one of the cache memories at an RN as discussed above.

A controller 300 (acting as an agent as mentioned above) controls writing to, reading from and eviction from memory storage 310. Associated with each cache line 305 stored in the storage 310 is a status indication (drawn, purely for schematic purposes, horizontally to the right of the relevant cache line). The controller 300 can change and/or report the status of a cache line according to operations conducted locally and/or in response to instructions received from the HN as appropriate. Note that the particular cache memory structure, for example a set-associative structure, is not relevant to the present discussion.

Example statuses include invalid (I); Unique Clean (UC), indicating that this is a uniquely held copy that does not currently require writing back to main memory; Unique Dirty (UD) indicating that this is a uniquely held copy which differs from that held in main memory and so at some point will require writing back to main memory; Shared Clean (SC) indicating a shared copy (held in multiple cache memories) which is clean; and Shared Dirty (SD) indicating a shared copy that will at some point require writing back to main memory. Note that the "dirty" indication does not necessarily indicate that the copy differs from main memory, but rather that the RN at which it is held has the responsibility to write it back to memory. Note also that in the situation of shared copies, only one of these is ever marked as "dirty" in at least some example protocols. Other shared copies may coexist with the SD copy, but in a SC status.

As between the "unique" and "shared" states, the indicator information is configured to indicate whether the respective copy is a unique copy amongst the set of data handling nodes.

Each node at which a data item is stored retains its own instance of the status of that data item, for example in the form of indicator data. In this way, in the example of FIG. 3, each data handling node is configured to hold the indicator data associated with a copy of a data item held by that data handling node.

Exclusive Transactions

So-called exclusive memory transactions and exclusive sequences will now be described.

An exclusive sequence, formed of exclusive memory transactions, does not prevent other accesses to the memory address or cache line(s) in question but does allow a detection of whether an intervening access has taken place, in which case the exclusive transaction aborts.

Figure 4A:
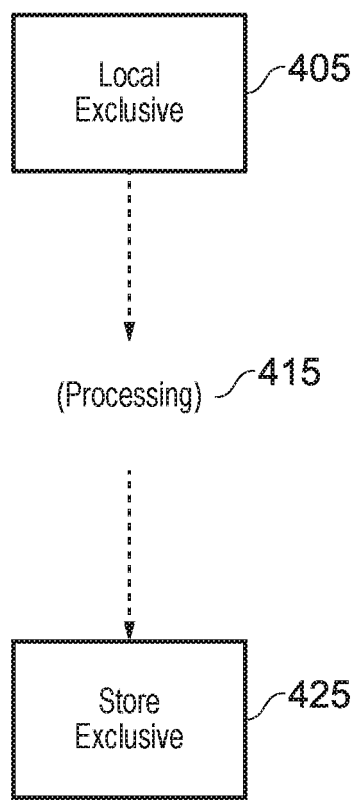
FIG. 4a schematically illustrates an exclusive sequence.

An overview of an exclusive sequence is illustrated schematically in FIG. 4a. The process starts for the Arm 64-bit architecture, for example, with an exclusive load (sometimes abbreviated to LDREX) 405.

Some processing 415 then takes place with respect to the relevant line. The amount of time taken by this processing is not defined and can be variable. In other words, there is not a predefined interval between the exclusive load 405 and a subsequent exclusive store 425.

If the line is invalidated at the RN between the steps 405 and 425, the sequence will fail and corrective action will need to be taken by the program, for example in the form of a retry of the exclusive load and store.

As shown schematically in FIG. 4b, exclusive memory access may be controlled by so-called exclusive monitors. An exclusive monitor may be considered to be a simple state machine having just two possible states: "open" and "exclusive".

By setting the exclusive monitor and subsequently checking its state, a memory transaction may be able to detect whether any other intervening action has access to the memory address or addresses covered by the exclusive monitor. In a distributed system such as that shown in FIG. 1, each RN 400 may have a respective "local exclusive monitor" (LEM) 410 associated with the respective RN (or indeed with a processing core within the RN). In some example arrangements, the LEM may be integrated with the load-store unit of the relevant core. In some examples the LEM may provide a vector allowing for the monitoring of a set of more than one load and store.

A global exclusive monitor or GEM 420 may be associated with multiple nodes and may be provided, for example, at the home node 430 so as to track exclusivity for a number of potential addresses from a number of potential processing elements. In other examples, a GEM may not be used, but instead this functionality can be provided by a snoop filter and/or directory.

Some example arrangements employ both local and global exclusive monitors.

In operation, as mentioned above, the exclusive monitors may act as two-state state machines, moveable between the pair of states mentioned above.

Another alternative implementation could avoid the need for an exclusive monitor check and simply make a line that is effectively non-coherent which the data packet is built in.

FIGS. 5 and 6 provide schematic flowcharts illustrating example ways in which exclusive monitoring (employing exclusive monitors) can be used. As discussed, this is just an example and other mechanisms for obtaining exclusivity can be employed instead.

Referring to FIG. 5, in order to initiate a so-called exclusive load operation, at a step 500 one or more exclusive monitors (whether LEM or GEM or both) relevant to the load operation are set, which is to say their state is moved to or retained at the "exclusive" state. Then, at a step 510, the exclusive load is executed.

Referring to FIG. 6, in order to perform a corresponding exclusive store operation, at a step 600 the one or more exclusive monitors relevant to that exclusive store are checked. If they are still in the "exclusive" state (as detected at a step 610) then control passes to a step 620 at which the store is executed and at a step 630 the process ends successfully.

If the answer is no at the step 610 then the process aborts at a step 640.

So, the use of the exclusive monitors allows a detection to be made as to whether an intervening process has already written back to the relevant address or addresses, in which case the exclusive store is itself aborted.

A fundamental principle of operation for exclusive accesses of this type is that when multiple agents are contending for the exclusive access, it is the "first to store" that succeeds. This feature derives from the observation that an exclusive load followed by an exclusive store is not necessarily an atomic operation and is in fact permitted to have any number of instructions between the load and store portions.

A potential problem can occur if multiple agents were to start an exclusive sequence in a staggered fashion, and each time a sequence is started it prevents the completion of another exclusive sequence. It is possible in such circumstances for a so-called "live-lock" to occur such that no sequence ever reaches completion and all of the agents end up having to repeat their respective sequences. In some examples, an exclusive agent could arbitrate this via "credits" so that multiple agents could be given tokens to perform exclusive atomic writes to the end point or destination.

Therefore, in summary, an exclusive monitor may be considered as is a simple state machine, with the possible states open and exclusive. To support synchronization between processors, a system would implement two sets of monitors, local and global. A Load-Exclusive operation updates the monitors to exclusive state. A Store-Exclusive operation accesses the monitor(s) to determine whether it can complete successfully. A Store-Exclusive can succeed only if all accessed exclusive monitors are in the exclusive state. A Local Exclusive Monitor may be considered as a monitor associated with a single private core.

In such arrangements, for example in a multi-processing element system, memory that is accessed by multiple processing elements is considered to be shared. A Local Exclusive Monitor is not sufficient to provide exclusivity guarantees for memory that could be in use outside of the local processor element. Therefore, most architectures implement a Global Exclusive Monitor or other arrangement providing similar overall functionality which must be consulted in addition to the local monitor before an exclusive store is considered to have succeeded. In general, a store will not be retired from the core until both the local and global monitors (where used) are consulted.

Conditional Operations

Figure 7:
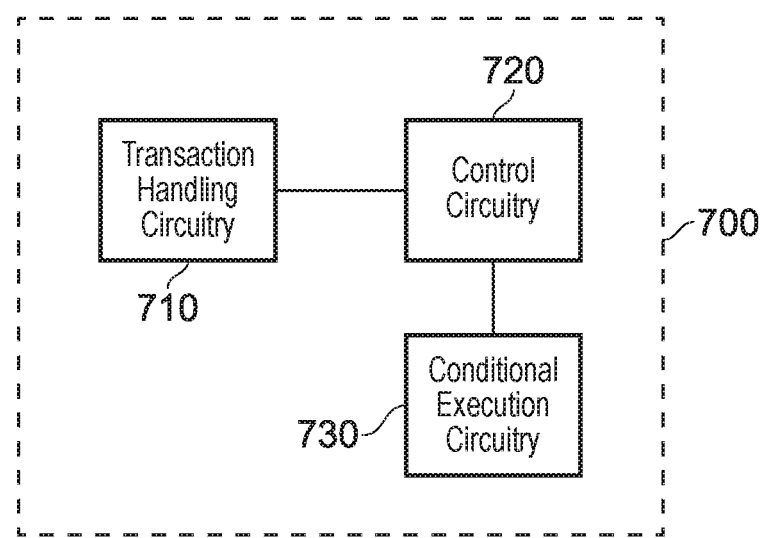
FIG. 7 schematically illustrates a data handling node.

FIG. 7 schematically illustrates a data-handling node 700 having transaction handling circuitry 710, control circuitry 720 and conditional execution circuitry 730.

The basic principle behind the circuitry of FIG. 7 is that the transaction handling circuitry 710 is capable of handling transactions within a coherent system in a way which is compatible with previously proposed transaction handling operations except that the execution and outcome of the transaction is dependent upon the outcome of an execution condition which is communicated to the node 700 in association with or indeed as part of the request which the node 700 receives.

When the outcome of the execution condition, as executed or tested by the conditional execution circuitry 730, is successful, the control circuitry 700 controls the transaction handling circuitry 710 to perform the requested transaction and to communicate a completion-success indicator to the requesting node. When the outcome of the execution condition is a failure, the control circuitry 720 controls the transaction handling circuitry 710 to communicate a completion-failure indicator to the requesting node.

Various examples of different types of conditional operations relevant to the present embodiments will be discussed below.

Examples of Execution Conditions

The execution condition may be specified, for example, by reserved bits within the instruction format of the request made by the requesting node.

The execution condition as executed or tested by the conditional execution circuitry 730 may in some examples comprise a condition indicating whether or not the target and/or destination node is currently capable of fulfilling the request made by the requesting node.

In other examples, the execution condition may be any condition relating to the prevailing state of a condition register, including for example a condition register relating to the arithmetic outcome of a proceeding operation.

It is not a requirement that a single condition is specified. Indeed, in some examples, under the control of the circuitry 730, the execution condition may comprise a logical comparison of a plurality of conditions with respective target outcomes. In some examples, the logical comparison is a comparison (such as a logical AND combination implemented by the circuitry 730 of plural conditional outcomes) which requires all of the plurality of conditions to have their respective target outcomes.

FURTHER BACKGROUND OF EMBODIMENTS

In computer systems, one or more processing elements (such as those discussed in connection with FIG. 8 below) communicate through data transfer protocols, which are known as communication, synchronization, and also loosely as data transfer. These data transfer protocols vary from software to hardware mechanisms, as is described in the following examples.

Background Example 1—Ring Buffer

As a first example, between a general purpose processing core (PE1), and an accelerator (PE2), a previously proposed arrangement is to use a software ring-buffer queue (RBQ) as a work queue where PE1 inserts a work item into the RBQ followed by actuation of a memory mapped register (MMR) to signal that a work item is available for pick-up. Similarly, upon completion another RBQ is used to store completion information (for example, where the data operated upon is stored), followed by an interrupt from PE2 to PE1 to signal completion and that data is available for pickup in the completion RBQ.

The processing elements may be RNs as discussed above.

Credits or tokens are terms used to describe the practice of pre-allocating entries within a queue. In previously proposed implementations, the PE1 would in practice receive a number of credits to reduce the number of overall writes to the MMR, thereby increasing efficiency. In some examples, the implementation could be that a requesting node caches a number of such tokens that enable it to ensure that the corresponding number of operations could potentially succeed. This is known from networking applications (including on-chip interconnects) where senders keep a counter of available write tokens. An implementation could do the same in this context to enable the sender to send multiple rapid fire stores.

A requesting node such as PE1 (writing to PE3) would ask first how many data items (such as cache lines) can it write and know that the write will succeed. the receiving node PE3 then issues credits. PE1 retrieves the credits and generates the writes. Holding a credit is then equivalent to knowing that the condition at the recipient node will succeed. In other words, this allow the conditional aspect at the recipient node to be exported (on a credit buy credit basis) to the sending node, or cached elsewhere in the system.

It should be noted that the RBQ is generally within main memory, typically some form of Dynamic Random-Access Memory (DRAM).

Figure 8:
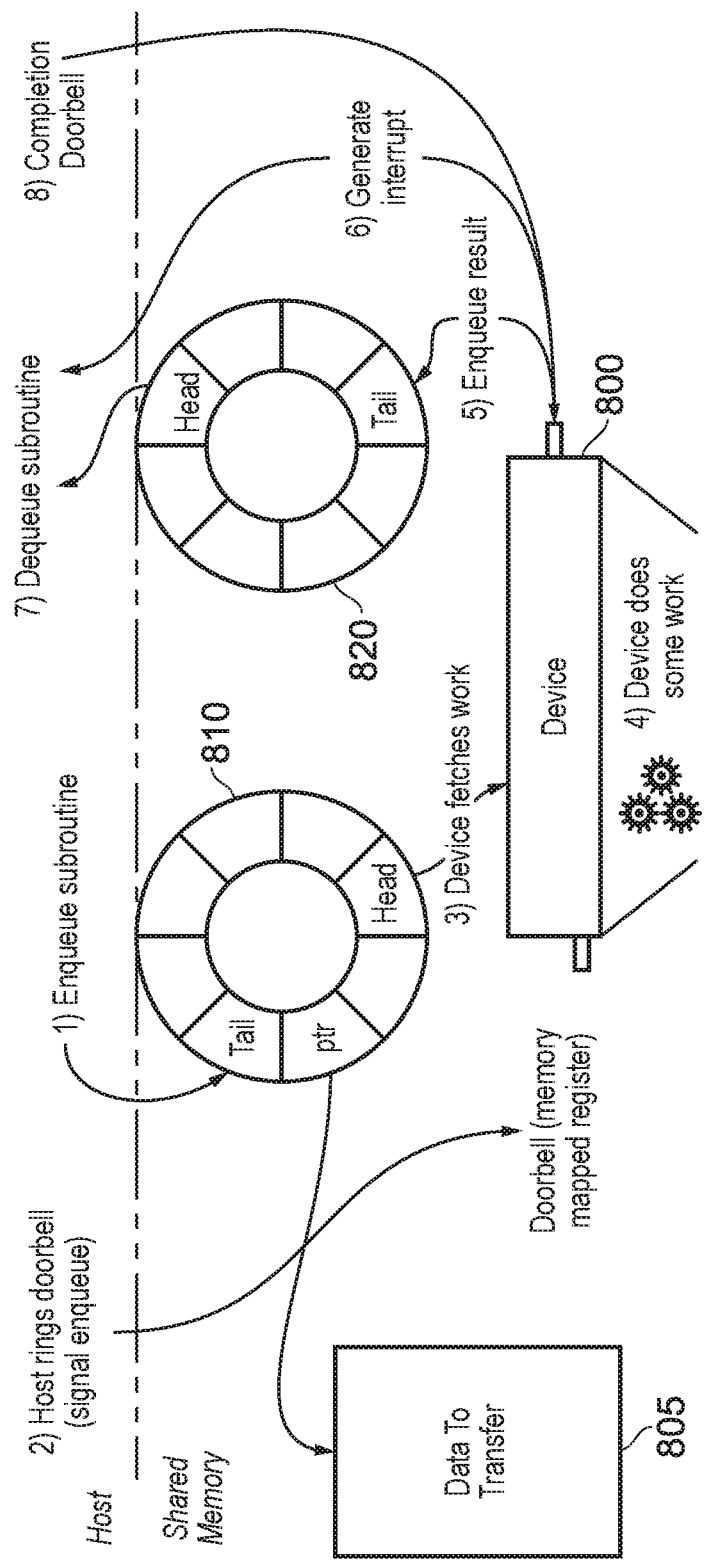
FIGS. 8 to 11 schematically illustrate background examples of data communication.

A schematic example of this type of arrangement is shown in FIG. 8, involving a representation of successive steps 1 to 8. PE1 writes "data to transfer" into an indirect buffer 805 and (at a step 1) writes a descriptor comprising at least a pointer to the data into an RBQ 810. This represents the enqueuing of a work item by PE1 for execution by PE2 (device 800) into the RBQ 810. PE2 indicates via a memory mapped register (step 2) that the work item is in the queue. PE2 fetches the work item at a step 3 and does the required work at step 4. At step 5, PE2 enqueues the result into another RBQ 820 and also (at a step 6) generates an interrupt to indicate to PE1 that the result is ready. PE2 retrieves the result at a step 7 and indicates completion at a step 8 via another write to a memory mapped register.

Background Example 2

A second example, between a general-purpose processing core (PE1), and a second general-purpose processing core (PE2), the situation differs depending on whether the desired programming modality is to be a shared queue (between multiple producers and/or multiple consumers) or between a single producer (PE1) and single consumer (PE2). This example covers the latter rather than the former. Example 3 below is more general, which is to say that example 3 could cover a single producer/single consumer situation, with potentially greater flexibility though potentially lower efficiency than example 2.

Between PE1 and PE2, a user could implement a simple ring-buffer which would enable synchronized data transfer (communication) between PE1 and PE2. In this scenario a control region with head/tail pointers is implemented as an in-memory structure along with a region of memory that acts as a buffer. The memory region that is allocated as a buffer is divided into numerically indexed bins, e.g., an array of size 16-Bytes could be apportioned into four 4-Byte regions and be indexed as zero through three. The head and tail pointers index entries into the buffer memory region. When pointed to the end, typically a ring-buffer pointer index would apply a modulus operator to the pointer, effectively allowing it to "wrap" back to the initial index of zero once that index is available for reading or writing respectively. The entire RBQ is in main memory, typically DRAM. When facilitating two-way communications (between PE1 and PE2) two such RBQs can combine to make bi-directional communication possible. In this scenario, the mechanisms are largely identical in concept to example 1. Credits as mentioned in example 1 can be used here as well.

Background Example 3

In a third example P processing elements act as producers (PE-P), and N processing elements act as consumers (PE-N). This differs from example 2 in that it is typically implemented as a doubly linked-list (DLL) in state of the art implementations. While the mechanism described in example 2 could be used as an P:N queue when supplied with a synchronization lock, typical DLL queue mechanisms require no locks.

Previously proposed arrangements are defined by variants of a so-called Ladam-Mozes and Shavit Queue ("An Optimistic Approach to Lock-Free FIFO Queues". Ladam-Mozes et al, in: Guerraoui R. (eds) Distributed Computing. DISC 2004. Lecture 8otes in Computer Science, vol 3274. Springer, Berlin, Heidelberg), which in turn builds on the so-called Michael-Scott Queue ("Simple, Fast, and Practical Non-Blocking and Blocking Concurrent Queue Algorithms", Michael et al, PODC '96: Proceedings of the fifteenth annual ACM symposium on Principles of distributed computing May 1996 Pages 267-275), which adds a back-link, to form a doubly-linked list. In brief, this queue allows a single CAS (compare and swap) operation and one sequentially consistent store operation to be used.

These citations are each incorporated into the present description by reference.

As an example, an existing linked list configuration can be used with a "next" (next item in the linked list) and "prev" (previous item in the linked list) pointer such as in this example:

```
struct node
{
  type_t payload;
  node *next; /** points towards tail **/
  node *prev; /** points towards head **/
};
node *tail_ptr; //initialized to the tail
```

Then, to add a new element at the tail pointer, which points currently to node B:
  A new node is constructed, (called, for the purposes of this description, A)
  The prev pointer on A is set to the current tail node
  The CAS swaps the tail pointer (tail_ptr) to the newly constructed node A,
  The tail node B next pointer is stored, for example with release consistency (a term indicating a synchronization based consistency model) and is set to the newly constructed node A which completes the enqueue operation.

This mechanism requires no locks; however, it does require at least one sequentially consistent store and a compare and swap. In addition to these, just like the other mechanisms, the data structures are entirely in main memory (typically DRAM). The compare and swap and the store operations require multiple memory accesses.

Comparison of Background Examples

| Mechanism | P:N or SPSC | Main Memory Accesses/Bus Accesses Details (enqueue through dequeue) | Accesses |
| --- | --- | --- | --- |
| Example 1 | SPSC | [Bus] 1/X where X is the number of credits received by producer<br>[Mem] Y, where Y is the number of stores required to write the Data To Store.<br>[Mem] Z, where Z is the number of stores required to save the descriptor which contains the ptr.<br>[Bus] Write to MMR (doorbell), which is of MMR-1 width.<br>[Mem] Interrupt routine from device (PE2) to core (PE1) is K writes.<br>[Mem] Read from core of data which is J reads.<br>[Bus] Write to device completion acknowledgement doorbell of width MMR-2. | Bus: 1/X + MMR-1 + MMR-2 + (Memory) Memory: Y + Z + K + J |
| Example 2 | SPSC | [Mem] 1/X where X is the number of credits received by producer<br>[Mem] Y, where Y is the number of stores required to write the Data To Store.<br>[Mem] Z, where Z is the number of stores required to save the descriptor which contains the ptr<br>[Mem] Read from core of data which is J reads.<br>[Mem] Update of read pointer | Bus: (Memory) Memory: 1/X + Y + Z + J |

-continued

| Mechanism | P:N or SPSC | Main Memory Accesses/Bus Accesses Details (enqueue through dequeue) | Accesses |
|---|---|---|---|
| Example 3 | MPMC | [Mem] Write of new tail entry with Y writes<br>[Mem] Compare and swap of tail pointer to swap in new tail (MMR-1 width)<br>[Mem] Store to adjust previous tail pointers in doubly linked list (P)<br>[Mem] Compare and swap of head pointer (MMR-2 width)<br>[Mem] Access of head element and changing of pointer to remove item (P) | Bus: (Memory)<br>Memory: Y +<br>MMR-1 +<br>(2 × P) + MMR-2 |

All the above previously proposed mechanisms try to do a few very common but very specific things when divorced from the details of the mechanisms (which will be referenced as List 1 in the discussion below):

List 1

1. Send data from PE1 to PE2
2. Preventing subsequent, newer, messages from overwriting earlier messages, potentially with multiple readers/writers.
3. Provide a means to build a bi-directional channel with the characteristics of one and two between PE1 and PE2 and indeed any combination of PE-P to PE-N.

Previously proposed mechanisms to provide 1-3 of List 1 above are largely ad hoc, that is they are device and system specific, requiring new software and hardware for every new PE or function to be added. Despite the presence of several communication standards such as PCIe which standardize some low-level data transfer protocols, and other standards such as AXI, CXL, CCIX which provide standards for data coherence as discussed above, much is still needed from both the programmer and hardware designer. With that in mind, embodiments of the present disclosure can provide techniques to codify and implement a mechanism that enables items one through three from List 1. That is, a mechanism to prevent newer messages from over-writing older messages. Depending on the directionality and memory type multiple coherence commands and a few variations are proposed, that are detailed in the next few sections.

Illustrative Examples Relating to List 1

Figure 9:
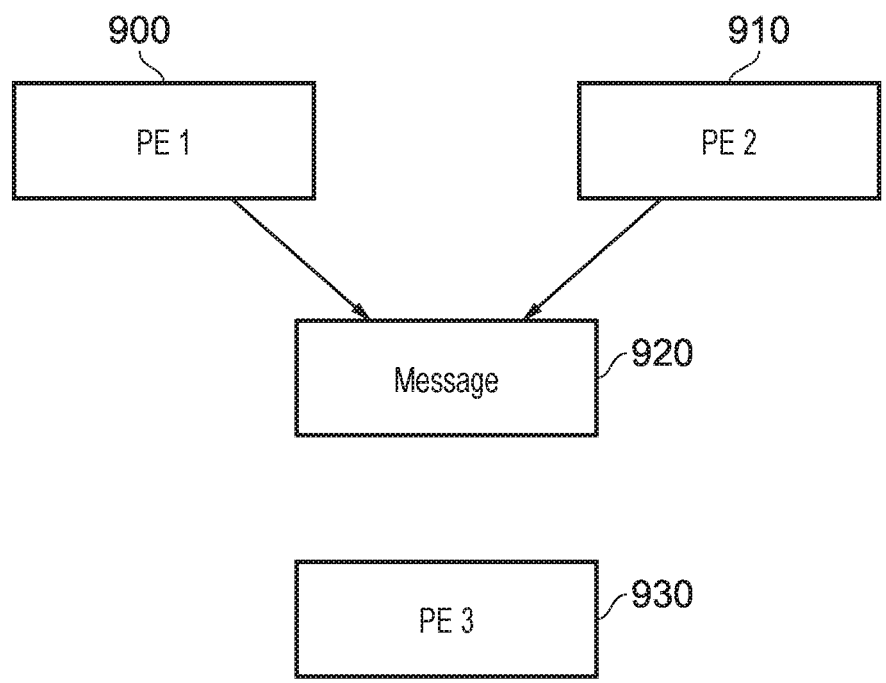
Figure 10:
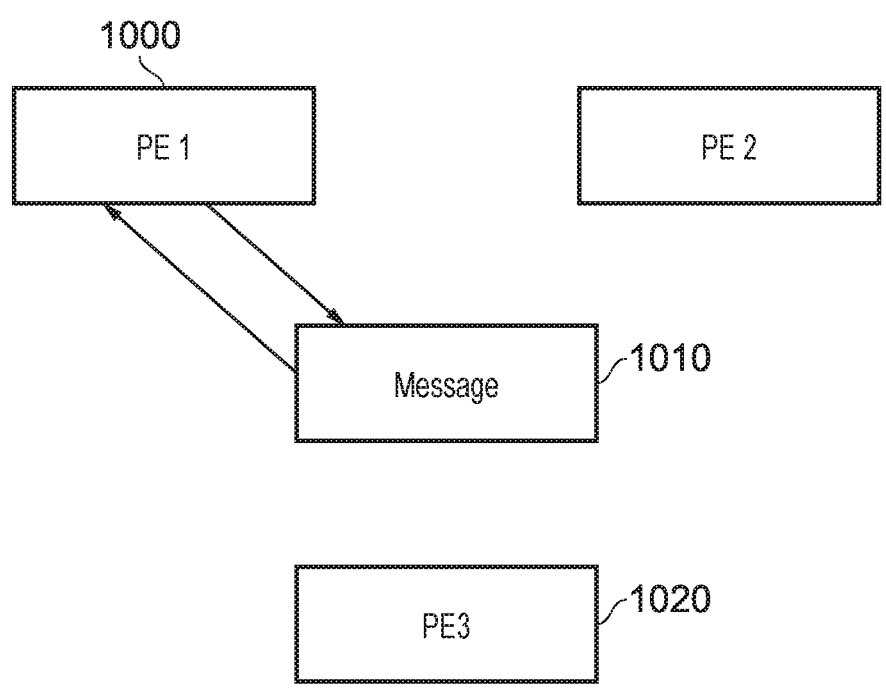
Figure 11:
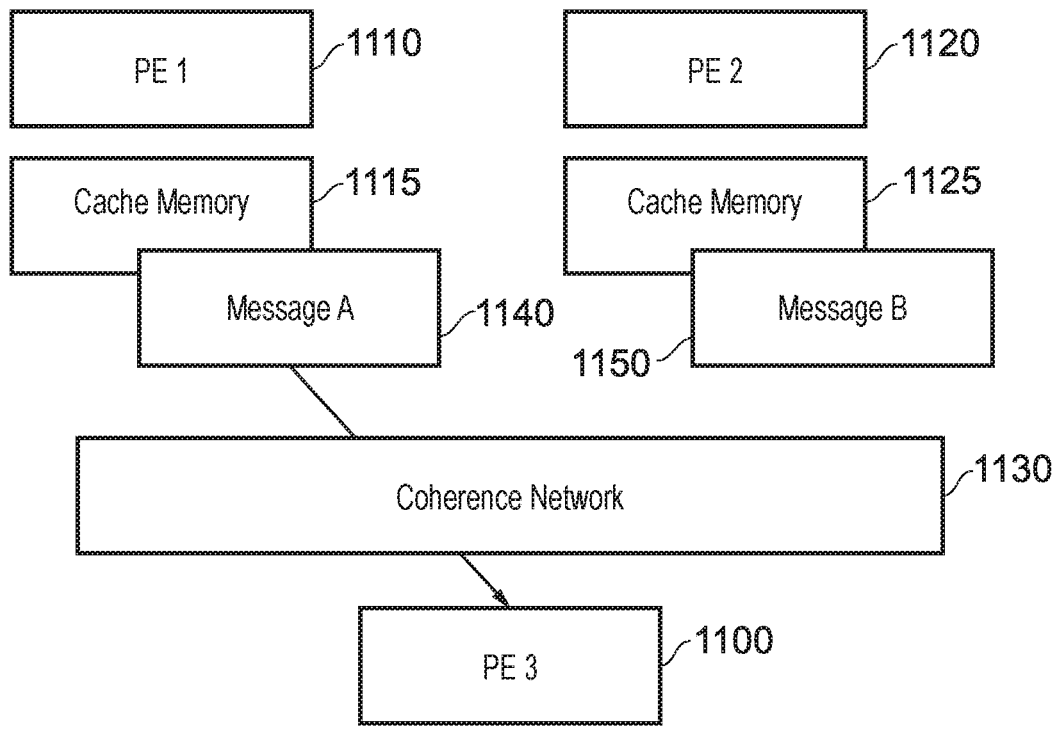

FIGS. 9 to 11 schematically illustrate at least some of the issues noted in items 1-3 from List 1.

FIG. 9 schematically illustrates multiple writers (otherwise known as master nodes, requesting nodes) (PE1, 900 and PE2, 910 in this example) to construct a message 920 or data transfer. When a message or data transfer is constructed by a given one of the multiple writers, it is beneficial to avoid any others of the multiple writers from overwriting and/or otherwise corrupting the message or data transfer before it is released to the relevant consumer or slave node 930 (in this example, PE3). Note that the PEs may act as a master node or a slave node for different transactions dependent upon the nature and initialisation of the transaction.

In FIG. 10, it is ensured that only one PE (in this example as drawn, PE1, 1000) is enabled to command a write. This is an exclusivity property that ensures that the full and most up-to-date message or data transfer 1010 is sent to the endpoint or consumer, in this case PE3, 1020. In other words the message 1010 is made exclusive to the writer so as to ensure that the most up-to-date full message packet is available to the writer. Only one of PE1 and PE2 in this example can be responsible for sending the actual data transfer to PE3.

FIG. 11 refers to the atomicity of write with respect to the consumer PE3 1100. In this example, PE1, 1110 has an associated cache memory 1115, and PE2, 1120, has an associated cache memory 1125. Coherence is managed by a coherence network 1130.

PE1 sends a message 1140 to PE3. PE3 needs to exclude other writers from writing to PE3 at the same time in order that multiple messages cannot overwrite one another. therefore, if PE2 1120 writes a message 1150, it will either return failure on acknowledgement or be serialized behind the message 1140 which is already in progress by PE3. The end point PE3 therefore provides a guarantee of atomicity of write to PE3, or in other words guarantees that if a message is received from (say) PE1, it is received and observed by PE3 all at once.

Example Embodiment

Figure 12:
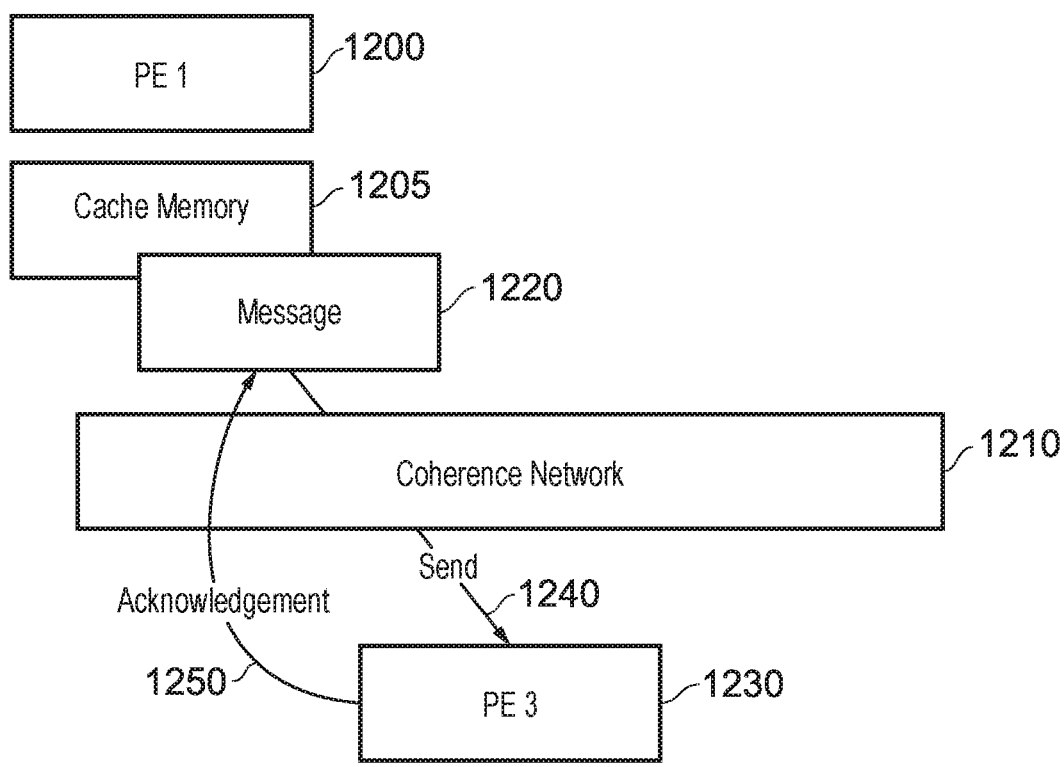
FIG. 12 schematically illustrates an example embodiment involving data communication.

Reference is now made to FIG. 12 which addresses flow control issues of List 1 above. Here, PE1, 1200 (having a cache memory 1205 and being associated with a coherence network 1210) sends a message 1220 to an endpoint PE3, 1230.

PE3 in this example is able to exclude other writers from writing to PE3 at the same time so that multiple messages cannot overwrite one another. PE3 also provides the guarantee of atomicity of write to PE3 so that a message received by PE3 is received as a whole.

Upon receipt of the store (an operation 1240), PE3 communicates an acknowledgement 1250 that either (a) it has been able to receive and handle the message or (b) there has been an error such as a lack of storage at PE3 so that PE3 cannot accept the message and a retry must occur.

Arrangements and operations to be discussed below will enable these features to be implemented.

From PE3 it is possible to inject data from one address space to another, this operation is commonly called a push or injection (or in some examples as a write-push) where data is written from address A, to address B.

In general, a significant matter is that PE3 is able to accept and (in at least some examples) act on data which is atomically received from a requester or sender. If it can do so, then the transfer proceeds, and if not it fails. The test relating to this condition may be one performed at and/or by PE3.

Some examples of operations to facilitate this will be described below. Other examples include a make-ready arrangement, by which PE3 allows a memory address or cache line to be written into.

Exclusivity

Assuming two example communicating agents, PE1 and PE3, a mechanism to provide exclusivity could differ depending on the address mapping of the target destination PE3 (assuming PE1 is the producer in this example). Sending a message from PE1 to PE3 over cacheable memory requires that the message be assembled and exclusive to PE1 prior to sending the message to PE3.

In one proposed mechanism, PE1 could initiate a load-exclusive to acquire the message to send (e.g., a cache line) into the private cache of PE1. This load-exclusive operation would also set a monitor which would ensure that PE1 would know if any other core attempted to access the message. A store-exclusive could then be used to store to the device, checking the exclusive monitor to ensure exclusivity is maintained before issuing the store. In the present implementation the standard exclusivity is also augmented to enable the device, PE3 to deactivate the exclusive monitor if in fact the write will not succeed. It has been previously mentioned that "credits" are one mechanism to enable fewer bus transactions to be done. In the present implementation, the load-exclusive operation itself, acts as a credit. If another core, PEx attempts to write to PE3's memory address (a form of an MMR), the exclusive monitor is unset and the exclusive store fails. The exclusive monitor could be augmented to maintain multiple credits, representing a pre-caching of exclusivity and success for multiple subsequent stores to the same address. This mechanism works for cacheable memory.

This mechanism may use, for example, the "write-conditional" and "write-clean conditional" operation variants described in the sections below. Here the condition may be, for example, related to the prevailing state of the exclusive monitor.

In another proposed mechanism, if the device MMR is mapped to what is termed as "device" memory, then traditionally that address is not cacheable. In this instance, it is possible to use a so-called make-ready command on a cacheable memory address (which is the message to be sent) that targets this cacheable memory address to be stored to another device memory address. In this instance, the make-ready is equivalent to ensuring that PE1, the initiator of the make-ready command, has exclusive access to the target cache line. In example implementations, because this line is effectively a device memory address and may occupy a separate data buffer region from the original, it is non-coherent (which is to say it is not snoopable). A context swap would invalidate this cache line. A subsequent store operation (equivalent to a store-conditional operation, though for this specific case of storing to device memory) stores this line to the target MMR or address.

This mechanism may also be used for cacheable memory. The store in this case could utilize a credit monitor or exclusive monitor to check locally whether a store will succeed before the request exits the core, it could also store all the way to the endpoint (PE3) before a condition acknowledgement is returned to PE1. Upon an atomic-store-conditional (which actuates the write-conditional operation variant), the queue buffer memory that is set through make-ready is freed, to retry a subsequent make-ready call is performed.

This mechanism therefore uses either the write-push-conditional mechanism (to cacheable memory) or a write-conditional variant to device memory. Here the condition may be, for example, related to the prevailing state of the exclusive monitor and/or the credit. Therefore this implementation can target both cacheable and non-cacheable memory.

In the examples to be discussed below, the target of a communication transaction may be another PE, for example acting as a master or a slave node, or may be the main memory, or may be the home node. The destination may be a master node or a home node.

Write-Conditional

Figure 13:
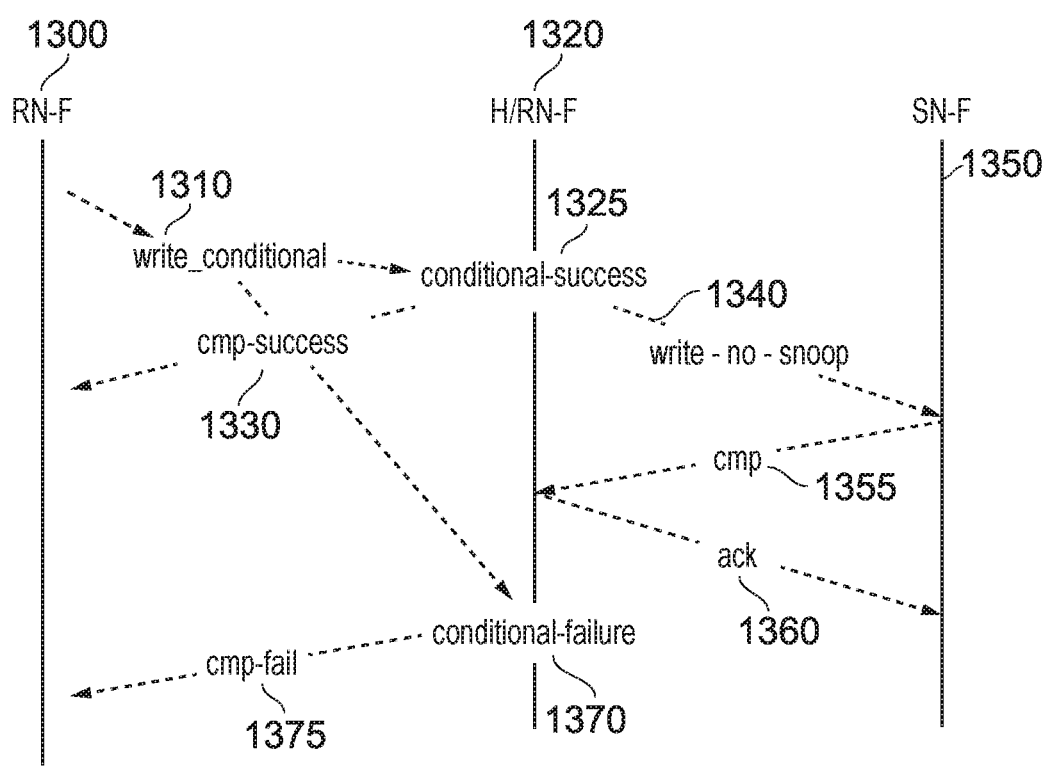
FIG. 13 schematically illustrates a write-conditional operation.

An example mechanism, to be referred to as write-conditional operation, will now be described with reference to FIG. 13. This operation allows a "send with condition" operation to toggle transference of a cache line or coherence unit from one RN (referred to as the "requesting node") to a destination node by providing a transaction request to a target node. The condition here may be that the target node is able to control writing of the data item to the destination node.

Referring to FIG. 13, in which once again time runs vertically down the diagram, the requesting node 1300 issues a write-conditional request 1310 to the target node 1320. In the case of a conditional success 1325, the target node communicates a conditional success indicator 1330 back to the requesting node. The target node also initiates a write operation 1340 such as a so-called write-no-snoop operation in order to write the line to the destination node 1350. Completion 1355 and acknowledgement 1360 messages are passed between the target node and the destination node as normal.

On the other hand, if the conditional outcome was a failure 1370 then the target node 1320 issues a failure indicator 1375 to the requesting node.

Therefore, a bus transaction or write operation is conditionally executed in dependence upon the outcome of some conditional code.

The concept here is that of a conditional write without the "clean" operation of the write-clean-conditional operation to be described below. That conditional write is atomic with respect to observers and can be to cacheable memory or non-cacheable memory. It can be facilitated through the "exclusive" monitor or by other mechanisms as discussed above. The data in the cache that is the source operand can be coherence cacheable memory, the exclusivity can be maintained by either using a so-called "make buffer" command which locks the line temporarily or through use of the exclusive monitor. In either case, this is a two-part operation, the make buffer would be one operation, then the store must be another (now whether it's an exclusive store or a device memory store is up to the implementer). As an example, the aim could be to store (to a cacheable address A) a work queue with the conditional store. That address A could be the target of a make-buffer command which would make A non-coherent and locked until either a store happened, or a context swap occurred. Once that occurs to A then we can store A to a separate address B. Address B could be cacheable memory or non-cacheable device memory.

Write-Clean-Conditional

A further example mechanism, to be referred to as write-clean-conditional operation, will now be described with reference to FIG. 14. This operation allows a "send with condition" operation to toggle transference of a cache line from one RN (referred to as the "requesting node") to a destination node by providing a transaction request to a target node. The condition here may be that the target node is able to control writing of the data item to the destination node.

Referring to FIG. 14, in which once again time runs vertically down the diagram, the requesting node 1400 starts with a cache line 1405 in a unique dirty (UD) state and issues a write-clean-conditional request 1410 to the target node 1420. In the case of a conditional success 1425, the target node communicates a conditional success indicator 1430 back to the requesting node which responds by setting the line to a unique clean (UC) state 1435. The target node also initiates a write operation 1440 such as a so-called write-no-snoop operation in order to write the line to the destination node 1450. Completion 1455 and acknowledgement 1460 messages are passed between the target node and the destination node as normal.

Here, the execution condition may represent whether the target node is currently able to control writing of the data item to the destination node On the other hand, if the conditional outcome was a failure 1470 then the target node 1420 issues a failure indicator 1475 to the requesting node which retains the relevant line in the UD state 1480.

Therefore, at success, the process comprises controlling the indicator information associated with the copy of the given data item to indicate that the copy of the given data item has not been updated more recently than the data item held by the main memory; and at failure, the process comprises controlling the indicator information associated with the copy of the given data item to indicate that the copy of the given data item has been updated more recently than the data item held by the main memory.

At a successful completion the requesting node may be configured, in response to receipt of the completion-success indicator, to set the indicator information associated with the copy of the given data item to indicate that the main memory holds the most up to date version of the given data item.

Once again, a bus transaction or write operation is conditionally executed in dependence upon the outcome of some conditional code. When the conditional execution outcome is a success, the line at the requesting node is moved from UD into UC, or upon failure it is left in UD.

Note that this sequence of operations requires that the cache line reference by it must be in a unique state (UC or UD) so that it is the only copy in the coherent network. Note also that a line which is initially in the UC state will remain in the UC state, resulting in effectively a no-operation (NOP), in which case when the indicator information associated with the copy of the given data item indicates that the main memory holds the most up to date version of the given data item, the target node is configured not to control any change to the indicator information. In other words, in the case that at communication of the conditional request to the target node, the indicator information associated with the copy of the given data item indicates that the main memory holds the most up to date version of the given data item, the target node is configured not to control any change to the indicator information (935). Similarly, the requesting node is configured to communicate the conditional request in respect of the copy of the given data item when the indicator information associated with that copy indicates that the respective copy is a unique copy amongst the set of data handling nodes.

Write-Push-Conditional

Figure 15:
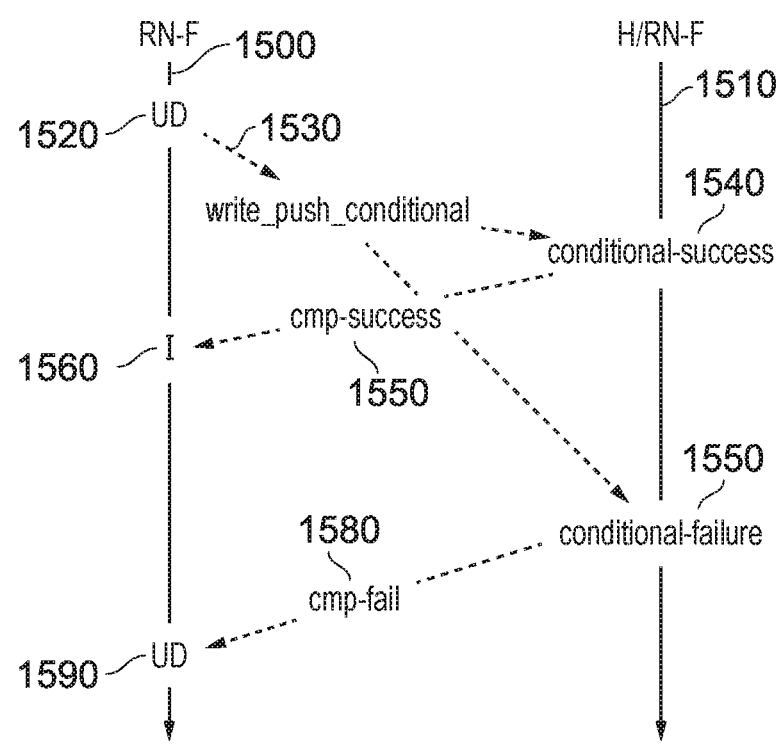
FIG. 15 schematically illustrates a write-push-conditional operation.

FIG. 15 is a schematic timing diagram showing operations as between a fully coherent requesting node 1500 and another node 1510 which may be a home node or another RN. In the context of the present description, the node 1500 will be referred to as a "requesting node" and the node 1510 will be referred to as a "target node", being the recipient or target of the conditional request. The execution condition may represent whether the destination node is currently able to receive the data item.

In FIG. 15, time runs generally down the diagram.

The overall aim of the process shown in FIG. 15 is for one node or "actor" in a coherent system to send a data range, e.g., a cache line or 64 Bytes, specified by a memory address to another node, potentially at a different address than its original address, thereby pushing the line from one physical address to another in order to transfer data. This transaction can be conducted on a conditional basis so that if the condition fails, the node pushing the cache line can retain it in a dirty state without dropping it as a previously proposed cache would.

In a previously proposed arrangement, if the requesting node 1500 were to send the cache line to the target node 1510 and the line was refused by the target node at its new physical address, then the data would be lost or written back to main memory with no notification to the sender that this was the case, e.g., the originator of the request at node 1510. In contrast, by allowing a conditional execution to be implemented, if the condition fails (for example if the target node is not able to handle the data range, e.g., cache line, at its new address) then the requesting node 1510, is notified of the failure and appropriate action could be taken. Examples of appropriate actions include either that the cache line is retained at the requesting node in a dirty state to be retried at a future time, or another action could be that the data range (e.g., cache line) is written back to memory as in the standard case, however, the requester, e.g., node 1510, is notified of the failure so that it may throttle future push-conditional requests appropriately.

In FIG. 15, starting with a cache line 1520 at the requesting node 1500 in a unique dirty (UD) state, a write-push-conditional operation 1530 is initiated, with the condition being that the target node 1510 is able to receive and handle the cache line, potentially at a new physical address. The condition is executed by the conditional execution circuitry 730 at the target node 1510. If the outcome of the conditional execution is a success 1540 then the cache line is transferred to the target node 1510 (which in this case is also the destination node for the transaction) and a success indicator 1550 is communicated back to the requesting node which, in response, invalidates 1560 its copy of that cache line. On the other hand, if the conditional execution outcome is a failure 1570 then the target node communicates a failure indicator 1580 to the requesting node which, in response, retains the relevant cache line in a UD state 1590.

In this arrangement, at success the process may comprise controlling the indicator information associated with the copy of the given data item to indicate that the copy of the given data item at the requesting node is invalid; and at failure the process may comprise controlling the indicator information associated with the copy of the given data item to indicate that the copy of the given data item has been updated more recently than the data item held by the main memory.

The write-push-conditional operation can be used in connection with so-called cache stashing in which a cache line is communicated from one node to another node, with or without specification of a cache where the data should be allocated in the form of a so-called stash hint. Previously proposed stashing mechanisms allow the stasher to specify a destination by a node identifier or a target cache. The stashee (the node receiving the stash) can either choose to take up the data or drop it. In previously proposed mechanisms, stashees are permitted to receive an empty transaction so that the stashee must then request the relevant field from memory using a standard read_unique or read_shared operation depending on the coherence condition indicated at the time of stashing.

The write-push-conditional operation would not change this behaviour but simply add new behaviours on top of the existing ones. The stashee would still be allowed to ignore the stash as long as a corresponding condition code is returned to the stasher. As in the current implementation, the stasher could leave the data field blank which would require the stashee to issue a read_unique or read_shared on success, however, the data-field could be contained inline along with the target address in which case the only response to the stasher would be a success or failure acknowledgement. Write-push-conditional still allows the possibility of leaving the data field blank, enabling the stashee to pull in the address at the preferred location rather than being targeted to a specific cache. A write-push-conditional can use either the direct mode, which indicates the exact node or target cache or the address mode which relies on the physical address of the target to indicate placement. If the target address is not in the coherence network, i.e., not in a cache, then the response to a write-push-conditional is a failure code if the addressing mode was physical address vs. node or target cache identifier. It should be noted that the use of the node or target cache identifier performs a line-allocate so that the line is typically always installed regardless of if the corresponding cache line was previously located in the coherence network. Using the physical addressing mode requires the cache line to have already been present, e.g., from a previous load or attempted use of a data address targeting that cache line.

The write-push-conditional arrangement described above may also be used to facilitate the operation of a so-called lazy context switch or migration such as an arrangement described in U.S. patent application Ser. No. 15/361,819 by Dunham et al (US2018/0150321 A1), the contents of which are incorporated into this description by reference. The mechanism can allow the lazy transfer of context data (for example, system register status data that could affect or processes and threads currently running on the system) with reduced risk of losing that data.

Figure 14:
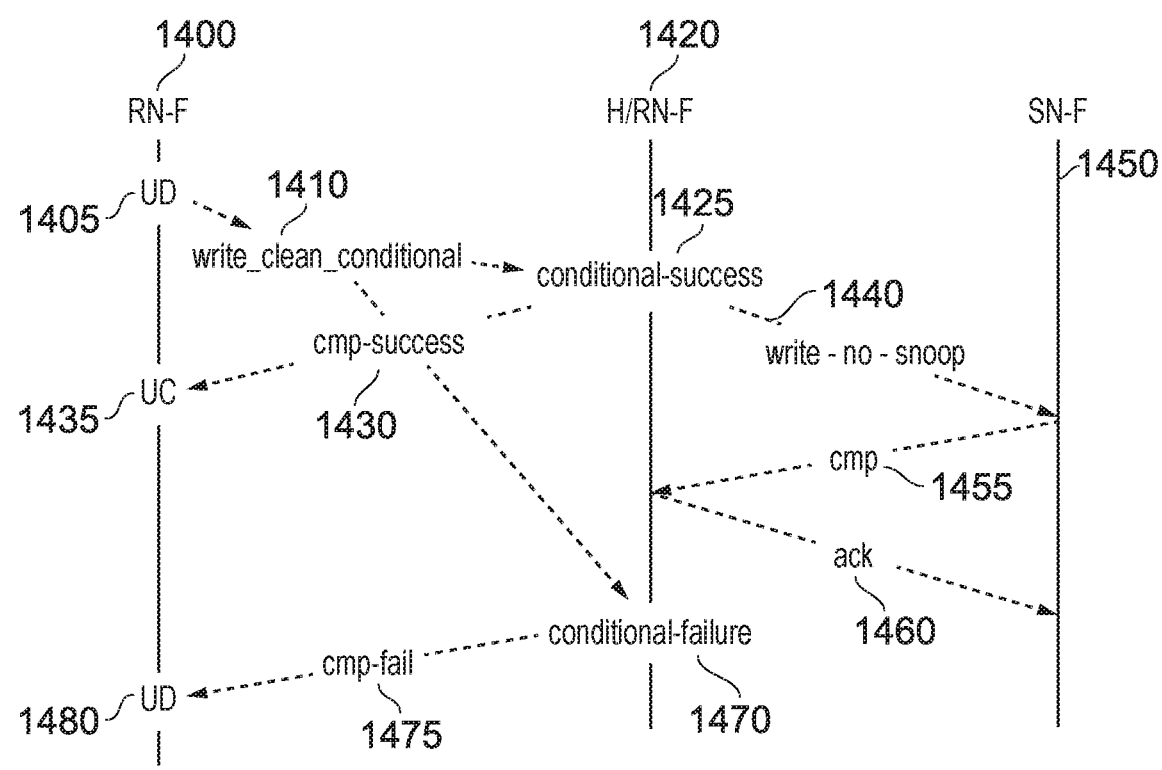
FIG. 14 schematically illustrates a write-clean-conditional operation.

Both FIGS. 14 and 15 provide examples in which a requesting node 1500, 1400 of the set of data handling nodes is configured to communicate a conditional request to a target node 1510, 1420 of the set of data handling nodes in respect of a copy of a given data item at a given memory address, the conditional request being associated with an execution condition and being a request that the copy of the given data item is written to a destination node 1510, 1450 of the data handling nodes; and the target node 1510, 1420 is configured, in response to the conditional request:

(i) when the outcome of the execution condition is successful, to write the data item to the destination node and to communicate a completion-success indicator 1550, 1430 to the requesting node; and (ii) when the outcome of the execution condition is a failure, to communicate a completion-failure indicator 1580, 1475 to the requesting node.

The target node 1510, 1420 may be the home node. In FIG. 15, the target node may be the same as the destination node, which may be a home or master node. In FIG. 14, the destination node may be a slave node, for example the main memory.

In FIG. 15, the step (i) comprises controlling the indicator information associated with the copy of the given data item to indicate that the copy of the given data item at the requesting node is invalid (I, 1560); and the step (ii) comprises controlling the indicator information associated with the copy of the given data item to indicate that the copy of the given data item has been updated more recently than the data item held by the main memory (UD, 1590). In particular, the requesting node is configured, in response to receipt of the completion-failure indicator 1580, to set the indicator information associated with the copy of the given data item to indicate that the copy of the given data item has been updated more recently than the data item held by the main memory.

In FIG. 14, the step (i) comprises controlling the indicator information associated with the copy of the given data item to indicate that the copy of the given data item has not been updated more recently than the data item held by the main memory (UC, 1435); and the step (ii) comprises controlling the indicator information associated with the copy of the given data item to indicate that the copy of the given data item has been updated more recently than the data item held by the main memory (UD, 1480). In particular, the requesting node is configured, in response to receipt of the completion-success indicator 1430, to set the indicator information associated with the copy of the given data item to indicate that the main memory holds the most up to date version of the given data item.

In FIGS. 14 and 15, the requesting node is configured, in response to receipt of the completion-failure indicator, to set the indicator information associated with the copy of the given data item to indicate that the copy of the given data item has been updated more recently than the data item held by the main memory.

Load-Link/Store Conditional

Some architecture examples, such as some architectures relating to processing systems developed by Arm Ltd, utilize a so-called load-link/store conditional (LL-SC) arrangement known as a load-exclusive+store-exclusive which are specified to be utilized in pairs.

Many extant architectures and examples of academic work specify the load-link and store-conditional such that exclusivity is the condition; this assumption is at least close to ubiquitous. The present disclosure develops and allows for the generalization of this assumption.

A load-link operation provides a current value of a memory location. A subsequent store-conditional operation in connection with the same memory location will store a new value to that memory location only if no updates have been applied to that memory location since the load-link was performed. These operations can collectively provide an atomic read-modify-write operation.

Previously proposed LL-SC mechanisms can provide atomicity for a single memory location (cache granule) with respect to exclusivity. A trend in coherence mechanisms is to extend it via open frameworks, such as CCIX (mentioned above). Protocols such as CCIX specify techniques to discover and enumerate accelerators within a system. However, actually sending something to an accelerator device potentially requires more coordination than is currently provided.

When writing into a work queue of an accelerator, it is expected that the writer have exclusivity to write the data to a specific address (which is to say, multiple threads are not attempting to write to the same accelerator queue entry).

To provide exclusivity, multiple software techniques exist. However they can be relatively slow, at least in comparison to example embodiments to be discussed below. Note that speed is critical or at least significant in order to increase the amount of usable parallelism while decreasing the time to solution).

Previously Proposed LL-SC instructions

An example of a previously proposed set of instructions to implement the LL-SC functionality is shown below:

LDREX r1, [r0]—takes value stored at the memory address in r0 and stores it in register r1.

STREX r2, r1, [r0]—takes value stored in register r1, places it conditionally in the memory address stored at r0, and sets r2 to indicate success or failure of the conditional.

Note that these are processor instructions. They may in turn be implemented at least in part by the various nodes issuing transaction requests which may include for example, write-clean-conditional requests.

Developments of LL-SC

Example embodiments involve augmenting the LL-SC arrangements discussed above.

In some example situations, there can be a need or at least a desire for an arrangement providing "enhanced exclusivity" in order to enable the receiver of such requests (which is to say, in these examples, the target of the issuer of the LL-SC) to refuse the request based on a condition specified by the Store Conditional instruction, with that refusal being atomic with an acknowledgement to the requester.

Figure 16:
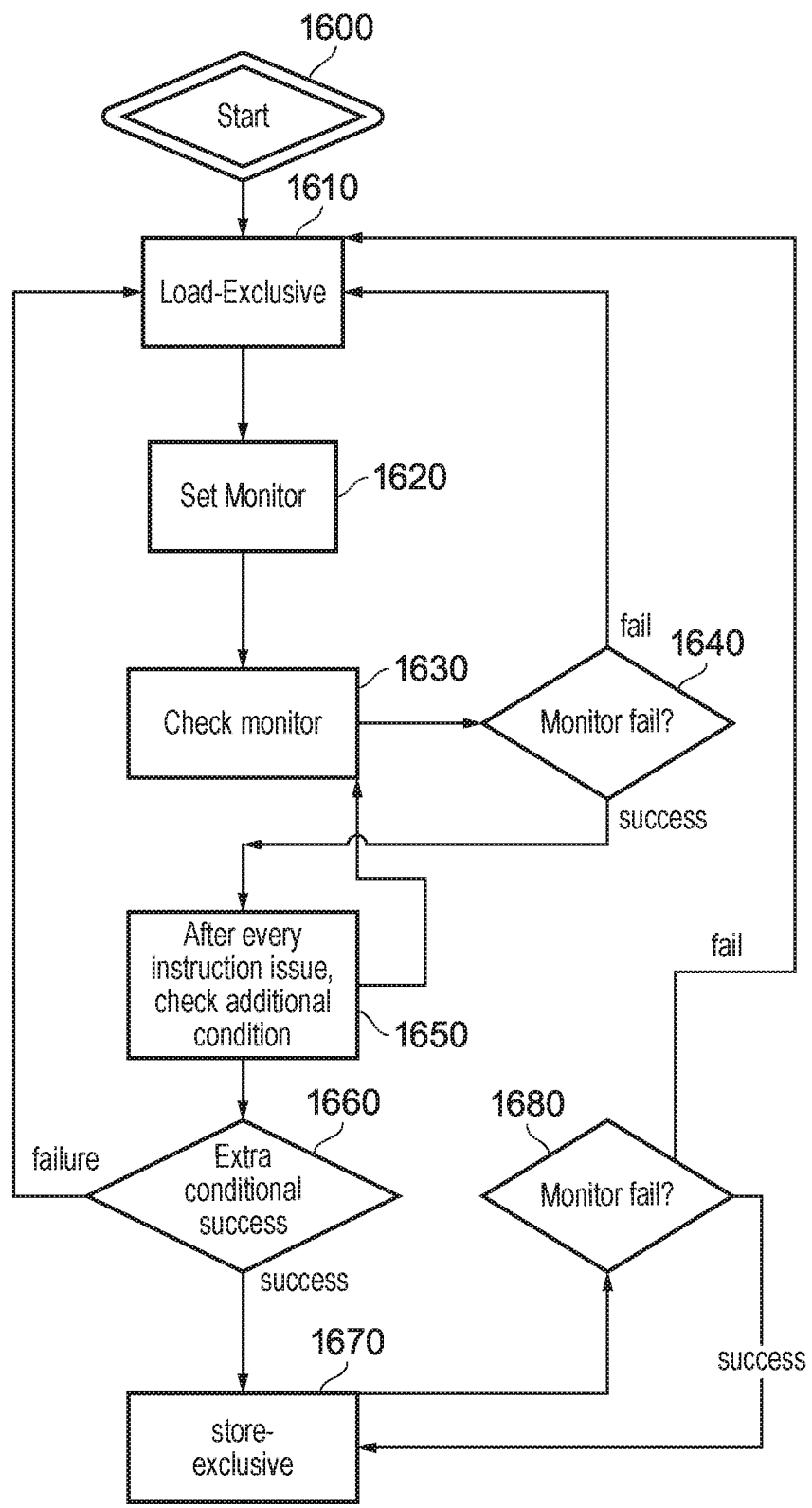
FIG. 16 is a schematic flowchart illustrating a method.

A previously proposed LL-SC is generally designed for use with single memory location exclusivity. By way of example, FIG. 16 schematically illustrates an attempt, using previously proposed mechanisms, to apply conditional execution to exclusive access.

From a start at a step 1600, a Load-exclusive operation is performed at a step 1610 and a monitor (as discussed above) is set at a step 1620.

A step 1630 involves checking the monitor. If, at a step 1640 the monitor fails the check then the exclusive operations are bought and control returns to the step 1610. On the other hand, if the monitor continues to be properly set then control passes to a step 1650 and which, after every instruction issued, the additional condition is checked. If, at a step 1660 the additional condition is a success then control passes to a step 1670 at which a store-exclusive operation is initiated. This involves re-checking the monitor at a step 1680. A failure at this stage aborts the process and control returns to the step 1610 whereas a success allows the store-exclusive process to complete.

Returning to the step 1660, in the case of failure control returns to the step 1610.

As shown schematically in FIG. 16, with previously proposed architectural mechanisms, the additional conditional must be loaded and checked independently of the first exclusive address, essentially attempting to do a second exclusive access that is dependent on the first. A failure 9f the monitor may result in a significant increase in the number of instructions executed and a resulting increase in the number of coherence transactions. Using previously proposed arrangements it may not be possible to guarantee success in such an operation without risking so-called live-lock (a situation similar to deadlock but in which the state of the processes involved in the live-lock may continue to change relative to one another).

Example embodiments to be discussed below can provide a mechanism to perform LL-SC with conditional execution (to be referred to as "LL-SC-C") that is atomic and which can be efficient for a wide range of application use cases: queueing accelerators, smart-NICs (network interface controllers), accelerator-rich systems built using CCIX. Implementing a work queue with LL-SC-C can enable a hypervisor (supervisor agent) to issue a work queue per address space, then allow multiple threads to write into that work queue.

A significant difference between the present examples and previously proposed arrangements is that the receiver itself can have other conditions outside of exclusivity (and value) that would relegate an exclusive conditional to need to fail. Currently, the failure 9f an exclusive conditional currently only assumes modification of value (state) by some other actor (such as an RN-F) via a coherent bus. However, in example embodiments, the failure 9f the conditional can be outside of the value being accessed. The failure 9f conditional can be outside of the calling node's control (or any other RN-F) and judged based on dynamic response from an intermediate node in the coherence structure 9f the receiver itself (either HN-F or RN-F). Embodiments of the disclosure can provide a condition register (monitor) that represents for example a Boolean (true/false) outcome if an a priori condition is met (specified at time of instruction/coherence operation issue).

To implement LL-SC-C, a conditional code can be passed to the coherence bus as part of the store transaction, for example by using reserved bits in the instruction format. That conditional code would be carried via a bus command such as the write-clean-conditional operation discussed in detail above. Prior to issuing a write-clean-conditional, it is assumed that the core has issued a load-exclusive operation and set both the local and global monitors.

In some examples, LL-SC may be implemented as follows:

Make_Q_Buff r2 [r1]
Str_Q_Buff [r3] r2

Here, in the first operation r2 indicates a failure (by a valid 0x00) or, where the returned value is not 0x00, a slot identifier showing which buffer was assigned by the instruction and which indirectly (by not being a failure indication also indicates success). r1 represents a physical address in cacheable memory. In the second operation, this stores a queue buffer at a destination device or cacheable memory address denoted by r3 and a slot identified by r2.

In a conditional variant LL-SC-C there is provided:

Str_Q_cond r4 [r3] r2

Here, failure is returned in r4; r3 holds a memory address; r2 holds a slot identifier; r4 returns a value which is zero (to indicate failure) or a value greater than 0 to indicate a slot offset.

Note that Make_Q_Buff sets the target cache lines as either non-coherent or exclusive depending on implementation.

Regarding the non-conditional version, the condition/exclusivity is ignored and not checked.

But regarding the conditional version, the monitor is checked or we set the line as non-coherent so exclusivity is ensured. Before writing there the write conditional is used for a write to this endpoint.

There is a third variant that uses the write clean conditional to clean the data buffer address before writing which has the effect of zeroing the buffer at the given slot at [VA]. As an example:

Make_Q_Buff r2 [r1]
Str_Q_Buff_cond_clean r4 [r3] r2

After execution on success then data at address [r1] is untouched, however the Q buffer contents at slot r2 are zeroed.

In these examples, a requesting node may be configured to initiate a sequence of operations requiring exclusive access to data at a given memory address, the sequence of operations including an exclusive store operation to the given memory address. The requesting node may be configured to implement the exclusive store operation using the conditional request. The exclusive store operation may comprise setting a particular value to data representing an exclusivity monitor.

Figure 17:
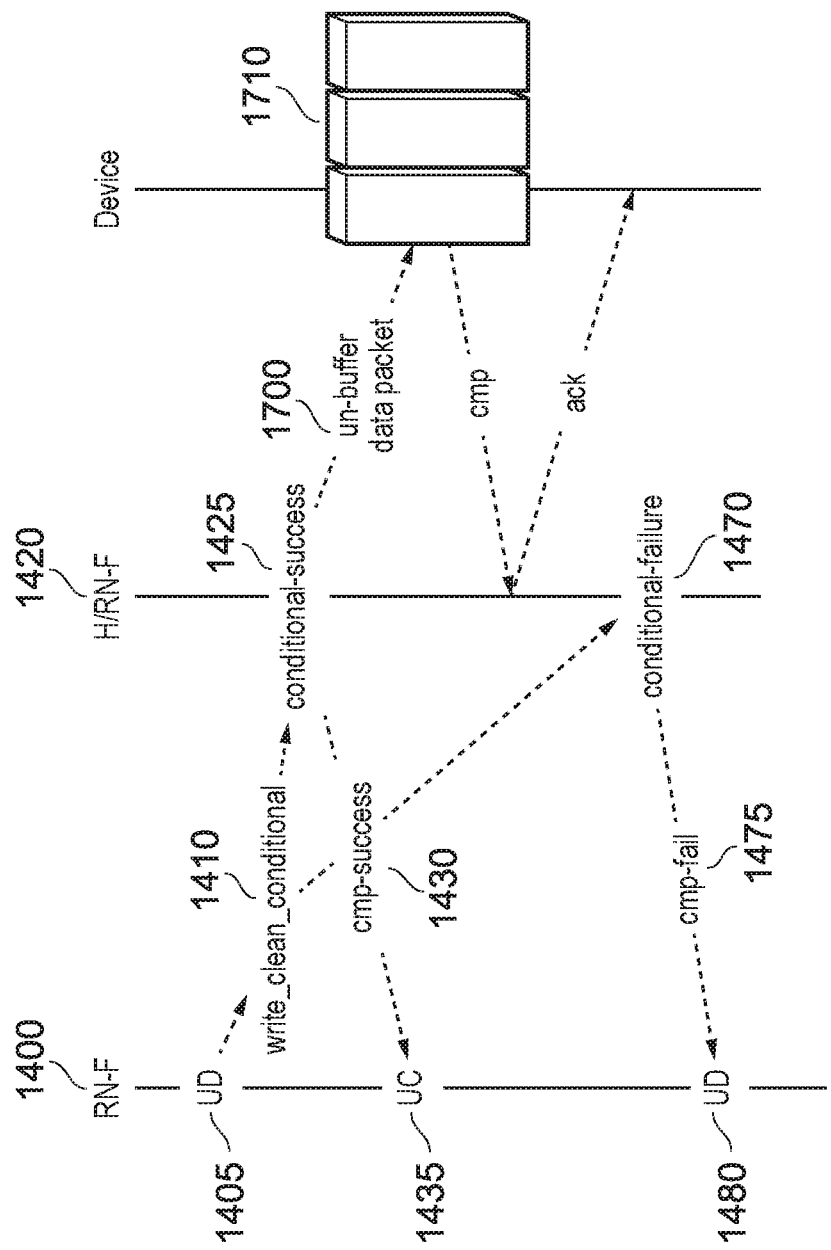
FIG. 17 schematically illustrates an example of a load-link-store-conditional+conditional operation.
Figure 18:
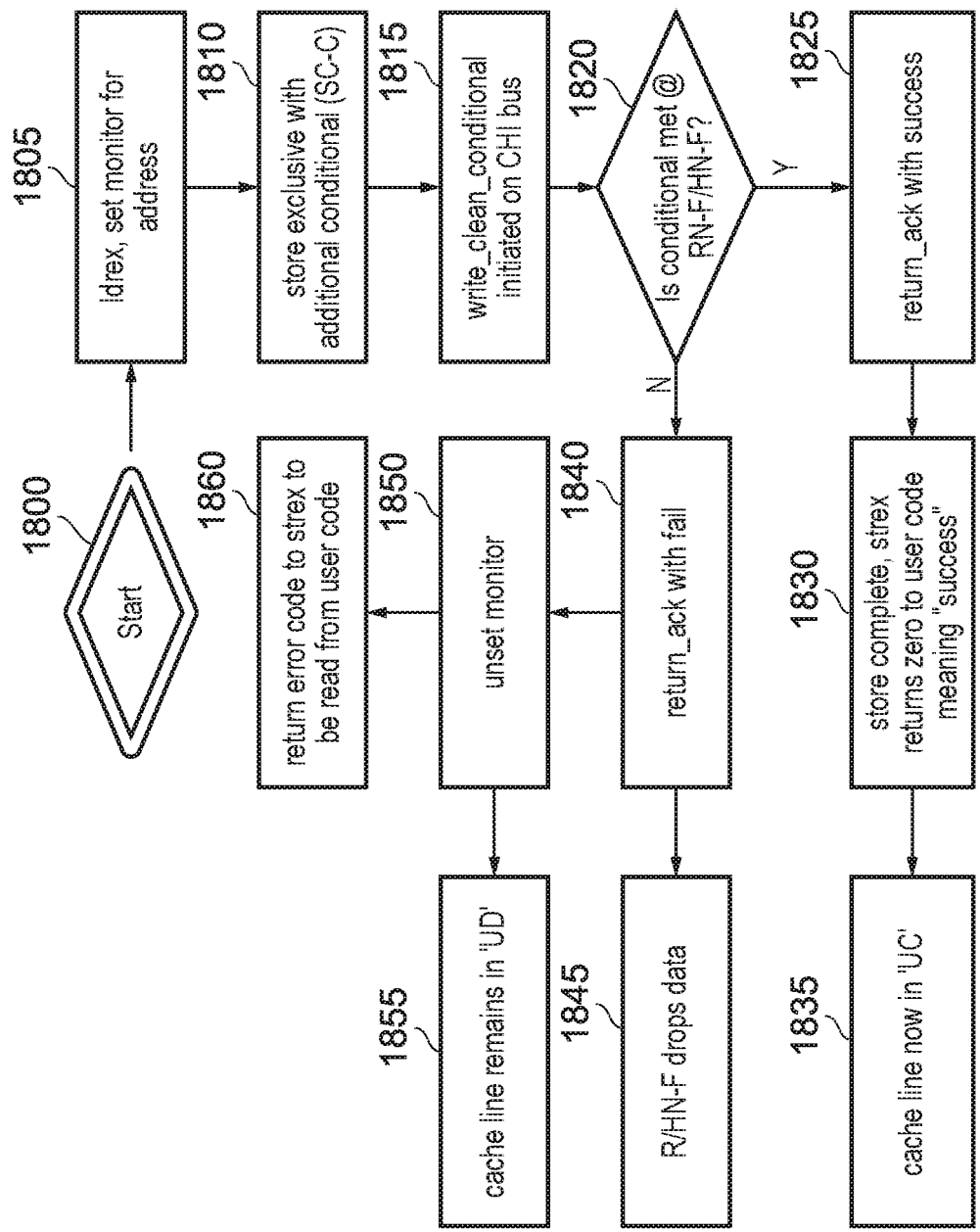
FIGS. 18 and 19 are schematic flowcharts illustrating respective methods.

Examples—FIGS. 17 and 18

FIG. 17 schematically illustrates a variant of the write-clean-conditional operation of FIG. 14 which may be applied to the present examples. Note that the arrangement of FIG. 14 is also applicable to the present examples.

In FIG. 17, features which are identical to those shown in FIG. 14 carry the same reference numerals and indeed the interaction between the nodes 1409 20 is the same as that shown in FIG. 14 in respect of the conditional-success 1425 and conditional-failure 1470 outcomes.

At the node 1420, in the case of the conditional-success outcome 1425, instead of issuing a write-no-snoop command, the command as issued is a write 1700 to a device such as a FIFO (first-in-first-out register) 1710 and un-buffering of the cache line from the node 1420's internal buffering stores.

FIG. 18 is a schematic flowchart illustrating the use of a write-clean-conditional operation in connection with a store-exclusive operation. From a start at a step 1800, an exclusive load is performed at a step 1805 and subsequently, an exclusive store with an additional condition is initiated at a step 1810.

In response, a write-clean-conditional operation is initiated at a step 1815 on the coherent bus. A step 1820 tests whether the condition is met (a successful conditional outcome) at the target node. If the and so is "yes" then at a step 1825 and acknowledgement (corresponding to the acknowledgement 1430 of FIG. 17) is returned indicating success; the exclusive store has completed so at a step 1830 the exclusive store operation returns a response (in this example, "zero") indicating success and the relevant cache line is now in the UC state 1435 at a step 1835.

Returning to the step 1820, if the conditional is not met then at a step 1840 a failure acknowledgement 1475 is returned and at a step 1845 the target node 1420 drops the data. Also from the step 1840, the exclusive monitor is unset at a step 1850; the cache line remains in the state UD 1480 at a step 1855 and at a step 1860, the exclusive store operation returns an error code.

FIG. 18 therefore provides an example in which the requesting node of the set of data handling nodes is configured to initiate a sequence of operations requiring exclusive access to data at a given memory address, the sequence of operations including an exclusive store operation to the given memory address. For example the requesting node may be configured to implement the exclusive store operation using the conditional request. For example the exclusive store operation may comprise setting a particular value to data representing an exclusivity monitor.

Comparative Examples in Assembly Code
(a) Using Previously Proposed Instruction Set Architecture

```
...code before critical section
LOOP:
  ldrex   x7,      [x8]        ;x8 is the location of the lock
  cmp     x7,      #1
  beq     LOOP                 ;loop if #0x01, somebody
                                already has lock
  strex   x2,      [x8], #1
  cmp     x2,      #1
  beq     LOOP                 ;lock acquire failed
                                ;lock acquired
  ldr     x5,      [x9]        ;condition code is
                                non-cacheable, in x9
                                ;above assumes we have
                                a format for [x9] to
                                ;to understand
  cmp     x5,      #0b101      ;check condition code for '5',
                                which is "avail"
  bne     TRYAGAIN             ;conditional failure
  str     #64 [x8], xX         ;xX contains data to
                                be stored in queue
  add     x10,     x8, #64
  dc cvac [x10]
  dmb     st
  str     [x8],    #0          ;clear lock, no need
                                to be exclusive
  b       DONE
TRYAGAIN:
  str     [x8],    #0          ;clear lock, we need
                                to start again
  b       LOOP
DONE:
...rest of code after critical section
```

The schematic example of assembly code shown in the extract above provide a lock around a critical region comprising the target memory region and the condition code. This example assumes that the condition code is set on a different data range which is stored in the register x9, for example on another page which is set as non-cacheable.

The presence of the conditional flag on a separate non-cacheable page allows for simplification of flushing and the like.

The example code also assumes that the work queue is embodied on a separate cache line from the mutex (mutual exclusion object, a program object allowing multiple program threads to take turns sharing the same resource). The loop moves three non-consecutive cache lines into the cache, issues one barrier, and issues one clean to the point of coherence for the write into the device queue. On average 12 instructions would be executed, assuming all succeed and there are no loops. If each of these hit in the cache plus one non-cacheable load to memory (based on assumptions about which cache level is accessed in each case) then the code requires 63 cycles in the best possible case.

(b) Using LL-SC-C

```
...code before queue
LOOP:
  ldrex   x7,     [r8]          ;r8 is the work
                                 queue address
  strex   x2,     [r8], r2,     ;r2 contains the work
                  #0b101         packet to store, '5'
                                 ;is the condition code
```

```
cmp     x2,      #1
beq     LOOP              ;loop back and try
                           again if failure
...code after work queue insertion
```

The mechanism using LL-SC-C would move a maximum of one cache line (via a store packet). Assuming all instructions are executed successfully, only four instructions would be executed against twelve in the previous example. Assuming the same cache and core configuration as in (a), and assuming the best case as before, this could write to a device (with a write-clean-conditional) in about 31 cycles which is slightly better than a two-fold reduction in cycles with about a three-fold reduction in overall data movement. This LL-SC-C variant assumes the accelerator is coherent and not device memory. For device memory, the make_ready and store_q_buff are preferred.

Summary Apparatus

The apparatus of FIG. 1 (or indeed FIG. 8 or 12, for example, operating in accordance with the techniques discussed above, provides an example of circuitry having: a set of data handling nodes comprising: two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory; a home node to serialise data access operations and to control coherency amongst data items held by the set of data handling nodes so that data written to a memory address is consistent with data read from that memory address in response to a subsequent access request; and one or more slave nodes including the main memory; in which: a requesting node of the set of data handling nodes is configured to communicate a conditional request to a target node of the set of data handling nodes in respect of a copy of a given data item at a given memory address, the conditional request being associated with an execution condition and being a request that the copy of the given data item is written to a destination node of the data handling nodes; and the target node is configured, in response to the conditional request: (i) when the outcome of the execution condition is successful, to write the data item to the destination node and to communicate a completion-success indicator to the requesting node; and (ii) when the outcome of the execution condition is a failure, to communicate a completion-failure indicator to the requesting node.

Summary Method

Figure 19:
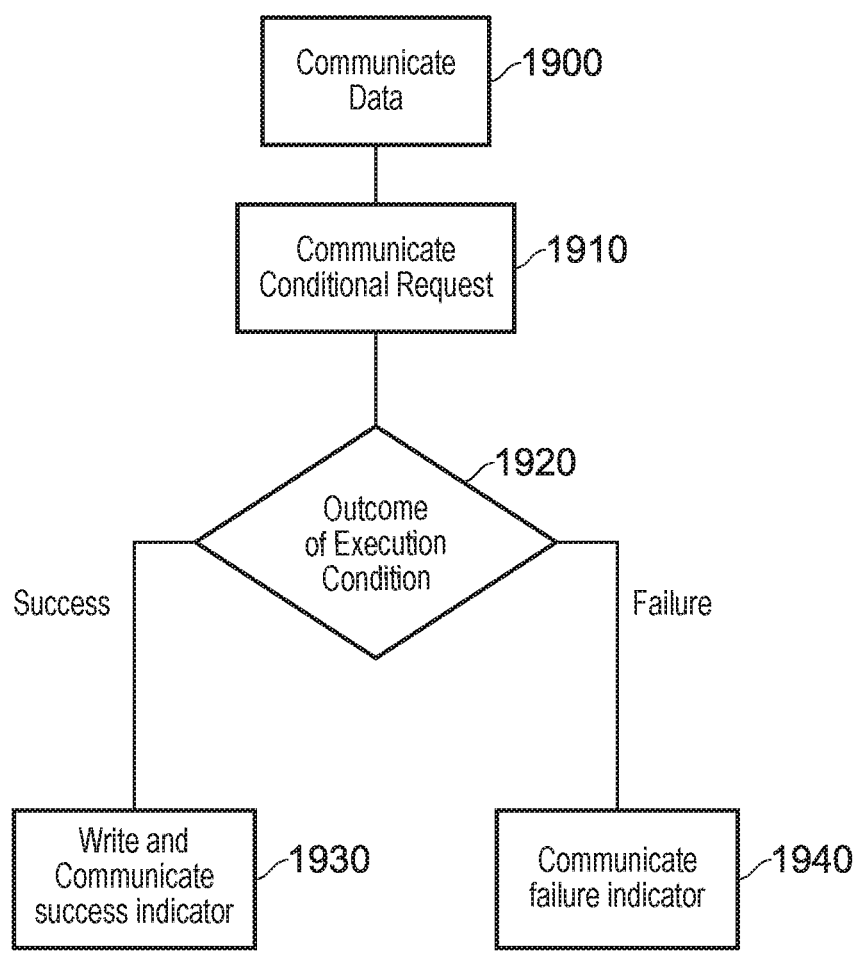

FIG. 19 is a schematic flowchart illustrating an example method comprising:

communicating (at a step 1900) data between a set of data handling nodes comprising:

two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory;

a home node to serialise data access operations and to control coherency amongst data items held by the set of data handling nodes so that data written to a memory address is consistent with data read from that memory address in response to a subsequent access request; and one or more slave nodes including the main memory;

a requesting node of the set of data handling nodes communicating (at a step 1910) a conditional request to a target node of the set of data handling nodes in respect of a copy of a given data item at a given memory address, the conditional request being associated with an execution condition and being a request that the copy of the given data item is written to a destination node of the data handling nodes; and the target node, in response to the conditional request (the outcome being illustrated schematically by a step 1920):

(i) writing (at a step 1930), when the outcome of the execution condition is successful, the data item to the destination node and to communicate a completion-success indicator to the requesting node; and (ii) communicating (at a step 1940), when the outcome of the execution condition is a failure, a completion-failure indicator to the requesting node.

The example method may be implemented by the circuitry of FIG. 1 for example.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. Circuitry having:

a set of data handling nodes comprising:

two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory;

a home node to serialise data access operations and to control coherency amongst data items held by the set of data handling nodes so that data written to a memory address is consistent with data read from that memory address in response to a subsequent access request; and one or more slave nodes including the main memory;

in which:

a requesting node of the set of data handling nodes is configured to communicate a conditional request to a target node of the set of data handling nodes in respect of a copy of a given data item at a given memory address, the conditional request being associated with an execution condition comprising a logical comparison of a plurality of conditions with respective target outcomes, the conditional request being a request that the copy of the given data item is written to a destination node of the data handling nodes; and the target node is configured, in response to the conditional request:
(i) when the outcome of the execution condition is successful, to write the data item to the destination node and to communicate a completion-success indicator to the requesting node; and
(ii) when the outcome of the execution condition is a failure, to communicate a completion-failure indicator to the requesting node.

2. The circuitry of claim 1, in which the indicator information is configured to indicate whether the respective copy is a unique copy amongst the set of data handling nodes.

3. The circuitry of claim 2, in which the requesting node is configured to communicate the conditional request in respect of the copy of the given data item when the indicator information associated with that copy indicates that the respective copy is a unique copy amongst the set of data handling nodes.

4. The circuitry of claim 1, in which the target node is the home node.

5. The circuitry of claim 1, in which the logical comparison is a comparison which requires all of the plurality of conditions to have their respective target outcomes.

6. The circuitry of claim 5, in which the destination node is the main memory.

7. The circuitry of claim 6, in which:
the step (i) comprises controlling the indicator information associated with the copy of the given data item to indicate that the copy of the given data item has not been updated more recently than the data item held by the main memory; and
the step (ii) comprises controlling the indicator information associated with the copy of the given data item to indicate that the copy of the given data item has been updated more recently than the data item held by the main memory.

8. The circuitry of claim 7, in which the requesting node is configured, in response to receipt of the completion-success indicator, to set the indicator information associated with the copy of the given data item to indicate that the main memory holds the most up to date version of the given data item.

9. The circuitry of claim 6, in which, in the case that at communication of the conditional request to the target node, the indicator information associated with the copy of the given data item indicates that the main memory holds the most up to date version of the given data item, the target node is configured not to control any change to the indicator information.

10. The circuitry of claim 1, in which each data handling node is configured to hold the indicator data associated with a copy of a data item held by that data handling node.

11. The circuitry of claim 10, in which the destination node is a master node or the home node.

12. The circuitry of claim 11, in which:
the step (i) comprises controlling the indicator information associated with the copy of the given data item to indicate that the copy of the given data item at the requesting node is invalid; and
the step (ii) comprises controlling the indicator information associated with the copy of the given data item to indicate that the copy of the given data item has been updated more recently than the data item held by the main memory.

13. The circuitry of claim 12, in which the requesting node is configured, in response to receipt of the completion-failure indicator, to set the indicator information associated with the copy of the given data item to indicate that the copy of the given data item has been updated more recently than the data item held by the main memory.

14. The circuitry of claim 11, in which the execution condition represents whether the destination node is currently able to receive the data item.

15. The circuitry of claim 1, in which the execution condition represents whether the target node is currently able to control writing of the data item to the destination node.

16. The circuitry of claim 1, in which the requesting node of the set of data handling nodes is configured to initiate a sequence of operations requiring exclusive access to data at a given memory address, the sequence of operations including an exclusive store operation to the given memory address.

17. The circuitry of claim 16, in which the requesting node is configured to implement the exclusive store operation using the conditional request.

18. The circuitry of claim 17, in which the exclusive store operation comprises setting a particular value to data representing an exclusivity monitor.

19. A method comprising:
communicating data between a set of data handling nodes comprising:
two or more master nodes each having respective storage circuitry to hold copies of data items from a main memory, each copy of a data item being associated with indicator information to indicate a coherency state of the respective copy, the indicator information being configured to indicate at least whether that copy has been updated more recently than the data item held by the main memory;
a home node to serialise data access operations and to control coherency amongst data items held by the set of data handling nodes so that data written to a memory address is consistent with data read from that memory address in response to a subsequent access request; and
one or more slave nodes including the main memory;
a requesting node of the set of data handling nodes communicating a conditional request to a target node of the set of data handling nodes in respect of a copy of a given data item at a given memory address, the conditional request being associated with an execution condition comprising a logical comparison of a plurality of conditions with respective target outcomes, the conditional request being a request that the copy of the given data item is written to a destination node of the data handling nodes; and
the target node, in response to the conditional request:
(i) writing, when the outcome of the execution condition is successful, the data item to the destination node and to communicate a completion-success indicator to the requesting node; and
(ii) communicating, when the outcome of the execution condition is a failure, a completion-failure indicator to the requesting node.

* * * * *